United States Patent
Ruh

(10) Patent No.: US 10,444,040 B2
(45) Date of Patent: Oct. 15, 2019

(54) CROWN WITH THREE-DIMENSIONAL INPUT

(71) Applicant: Apple Inc., Cupertino, CA (US)

(72) Inventor: Richard Ruh, Monte Sereno, CA (US)

(73) Assignee: Apple Inc., Cupertino, CA (US)

(*) Notice: Subject to any disclaimer, the term of this patent is extended or adjusted under 35 U.S.C. 154(b) by 54 days.

(21) Appl. No.: 14/866,481

(22) Filed: Sep. 25, 2015

(65) Prior Publication Data

US 2017/0089735 A1    Mar. 30, 2017

(51) Int. Cl.
| | |
|---|---|
| G01D 5/30 | (2006.01) |
| G06F 3/0362 | (2013.01) |
| G06F 3/0346 | (2013.01) |
| G06F 3/044 | (2006.01) |
| G06F 3/01 | (2006.01) |
| G06F 3/03 | (2006.01) |
| G04C 3/00 | (2006.01) |

(52) U.S. Cl.
CPC .............. *G01D 5/30* (2013.01); *G04C 3/001* (2013.01); *G04C 3/005* (2013.01); *G06F 3/014* (2013.01); *G06F 3/0312* (2013.01); *G06F 3/0346* (2013.01); *G06F 3/0362* (2013.01); *G06F 3/044* (2013.01); *G06F 2203/04101* (2013.01); *G06F 2203/04105* (2013.01)

(58) Field of Classification Search
None
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| (Continued) | | |

FOREIGN PATENT DOCUMENTS

| | | |
|---|---|---|
| DE | 202006000157 U1 | 5/2007 |
| JP | 2000-163031 A | 6/2000 |
| (Continued) | | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Lunyi Lao
*Assistant Examiner* — Benjamin X Casarez
(74) *Attorney, Agent, or Firm* — Kubota & Basol LLP

(57) ABSTRACT

In some examples, the apparatus comprises a mechanical input mechanism comprising a rotatable shaft, an optical sensor configured to detect a rotation of the shaft and detect a movement of the shaft toward or away from the optical sensor, and an optical sensor configured to detect light incident on the optical sensor, the light having a position and an orientation, the orientation of the light based on at least a position of the rotatable shaft, detect a rotation of the shaft, and detect a movement of the shaft based on at least a change in the orientation of the light. In some examples, a mechanical input mechanism is coupled to a housing and configured to contact a force sensor coupled to the housing in response to a user input. In some examples, the force sensor is configured to detect a position of the shaft and detect an amount of force between the shaft and the force sensor.

25 Claims, 14 Drawing Sheets

(56) References Cited

U.S. PATENT DOCUMENTS

| | | | |
|---|---|---|---|
| 5,589,828 A * | 12/1996 | Armstrong | G05G 9/04737 |
| | | | 200/6 A |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,232,959 B1 * | 5/2001 | Pedersen | G06F 1/1616 |
| | | | 345/161 |
| 6,310,610 B1 | 10/2001 | Beaton et al. | |
| 6,323,846 B1 | 11/2001 | Westerman et al. | |
| 6,661,438 B1 | 12/2003 | Shiraishi et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 8,624,836 B1 | 1/2014 | Miller et al. | |
| 9,542,009 B2 * | 1/2017 | Curtis | G06F 3/0338 |
| 2003/0025673 A1 * | 2/2003 | Ledbetter | G06F 3/0213 |
| | | | 345/163 |
| 2004/0227065 A1 * | 11/2004 | Thorburn | G01D 5/285 |
| | | | 250/231.13 |
| 2005/0231465 A1 * | 10/2005 | DePue | G01D 5/30 |
| | | | 345/156 |
| 2006/0197753 A1 | 9/2006 | Hotelling | |
| 2007/0035516 A1 | 2/2007 | Voto et al. | |
| 2007/0126700 A1 * | 6/2007 | Wright | G06F 3/0317 |
| | | | 345/161 |
| 2009/0101804 A1 * | 4/2009 | Phan Le | G01P 15/093 |
| | | | 250/221 |
| 2010/0053070 A1 * | 3/2010 | Tsai | G05G 9/047 |
| | | | 345/156 |
| 2010/0096537 A1 * | 4/2010 | Kang | H03K 17/968 |
| | | | 250/221 |
| 2011/0168874 A1 * | 7/2011 | Phan Le | G01S 7/4811 |
| | | | 250/208.6 |
| 2011/0174959 A1 * | 7/2011 | Geloven | G06F 3/0304 |
| | | | 250/208.6 |
| 2011/0240836 A1 * | 10/2011 | Phan Le | G01D 5/285 |
| | | | 250/231.11 |
| 2011/0242064 A1 * | 10/2011 | Ono | B60K 35/00 |
| | | | 345/184 |
| 2014/0353478 A1 * | 12/2014 | Hopp | G01D 5/34707 |
| | | | 250/231.13 |
| 2015/0041289 A1 * | 2/2015 | Ely | H01H 3/122 |
| | | | 200/4 |
| 2015/0103052 A1 * | 4/2015 | Kim | G05G 9/047 |
| | | | 345/175 |
| 2015/0168178 A1 * | 6/2015 | Hoover | G01D 5/245 |
| | | | 368/321 |
| 2016/0061636 A1 * | 3/2016 | Gowreesunker | G01D 5/3473 |
| | | | 250/205 |
| 2016/0069713 A1 * | 3/2016 | Ruh | G01D 5/34715 |
| | | | 250/231.14 |
| 2016/0116306 A1 * | 4/2016 | Ferri | G04C 3/001 |
| | | | 250/231.14 |
| 2016/0258784 A1 * | 9/2016 | Boonsom | G01D 5/347 |
| 2017/0205901 A1 * | 7/2017 | Chung | G06F 3/0312 |
| 2017/0263015 A1 * | 9/2017 | Teo | G06F 3/0312 |

FOREIGN PATENT DOCUMENTS

| | | |
|---|---|---|
| JP | 2001-202178 A | 7/2001 |
| JP | 2002-342033 A | 11/2002 |
| JP | 2004-184396 A | 7/2004 |
| WO | WO-2005/027168 A1 | 3/2005 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

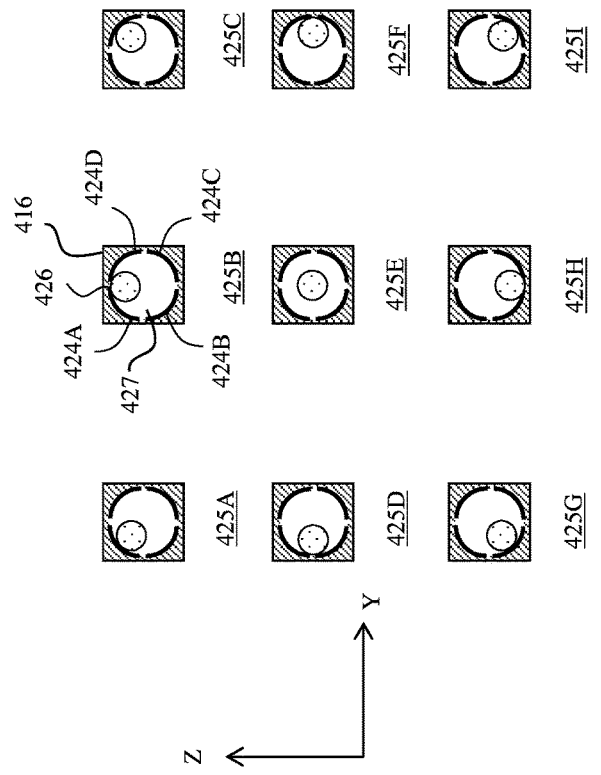
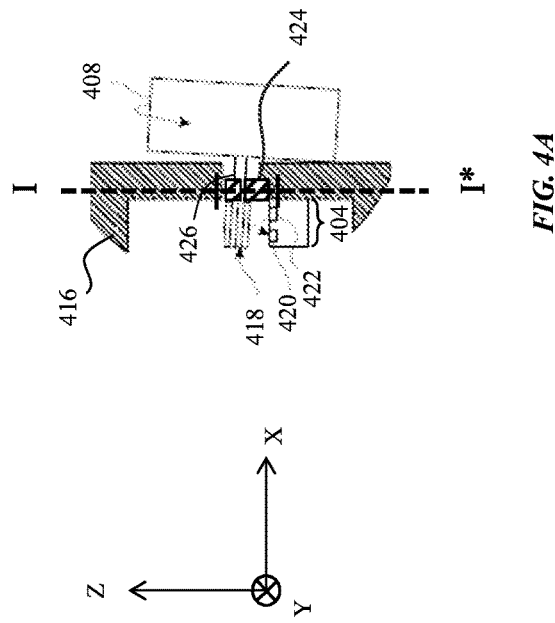
FIG. 4B
FIG. 4A

CROWN WITH THREE-DIMENSIONAL INPUT

FIELD OF THE DISCLOSURE

This relates generally to user inputs, such as mechanical inputs, and more particularly, to sensing three-dimensional inputs from a mechanical input.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

In addition to touch panels/touch screens, many electronic devices may also have mechanical inputs (or mechanical input mechanisms), such as buttons, switches, and/or knobs. These mechanical inputs can control power (i.e., on/off) and volume for the electronic devices, among other functions. However, sometimes these mechanical inputs fail to provide flexible user interactions with a device, such as the ability to accept three-dimensional user inputs.

SUMMARY OF THE DISCLOSURE

The present disclosure relates to sensor arrangements for enabling inputs for manipulating a user interface on a wearable electronic device using a mechanical rotary input (e.g., a crown). In some examples, the user interface can be scrolled or scaled in response to a rotation of the crown. The direction of the scrolling or scaling and the amount of scrolling or scaling can depend on the direction and amount of rotation of the crown, respectively. In some examples, the amount of scrolling or scaling can be proportional to the change in rotation angle of the crown. In other examples, a velocity of scrolling or a velocity of scaling can depend on a velocity of angular rotation of the crown. In these examples, a greater velocity of rotation can cause a greater velocity of scrolling or scaling to be performed on the displayed view. In some examples, tilting movements such as moving the crown up-and-down or side-to-side can allow more opportunities for a user to interact with a user interface of the electronic device. In order to detect tilting movements of the crown, sensors can be added to the electronic device, or sensors capable of detecting rotation of the crown can be configured to further detect tilting movements.

BRIEF DESCRIPTION OF THE DRAWINGS

FIGS. 4A-4B illustrate exemplary force sensor configurations for detecting three-dimensional movement of a crown according to examples of the disclosure.

DETAILED DESCRIPTION

In the following description of examples, reference is made to the accompanying drawings in which it is shown by way of illustration specific examples that can be practiced. It is to be understood that other examples can be practiced and structural changes can be made without departing from the scope of the disclosure.

Figure 1:
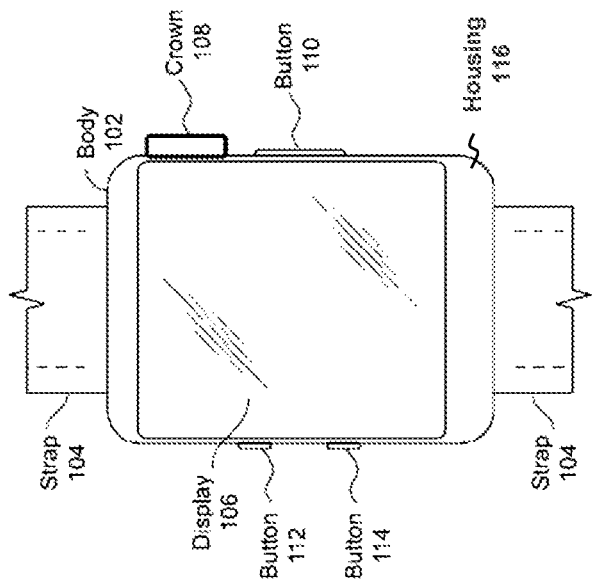
FIG. 1 illustrates an exemplary personal device in which the three-dimensional input sensing of the disclosure can be implemented according to examples of the disclosure.

FIG. 1 illustrates exemplary personal electronic device 100 in which the three-dimensional input sensing of the disclosure can be implemented according to examples of the disclosure. In the illustrated example, device 100 can be a watch that generally includes body 102 and strap 104 for affixing device 100 to the body of a user. That is, device 100 can be wearable. Body 102 can be designed to couple to straps 104. Device 100 can have touch-sensitive display screen 106 (hereafter touchscreen) and crown 108. Device 100 can also have buttons 110, 112, and 114. Though device 100 is illustrated as being a watch, it is understood that the examples of the disclosure can be implemented in devices other than watches, such as tablet computers, mobile phones, or any other wearable or non-wearable electronic device that can include a rotary input such as a crown.

Conventionally, the term 'crown,' in the context of a watch, can refer to the cap atop a stem or shaft for winding the watch. In the context of a personal electronic device 100, the crown can be a physical component of the electronic device, rather than a virtual crown on a touch sensitive display. Crown 108 can be mechanical, meaning that it can be connected to a sensor for converting physical movement of the crown into electrical signals. Crown 108 can rotate in two directions of rotation (e.g., forward and backward, or clockwise and counter-clockwise). Crown 108 can also be pushed in toward the body 102 of device 100 and/or be pulled away from the device. Crown 108 can be touch-sensitive, for example, using capacitive touch technologies or other suitable technologies that can detect whether a user is touching the crown. Moreover, crown 108 can further be configured to tilt in one or more directions or slide along a track at least partially around a perimeter of body 102. In some examples, more than one crown 108 can be included in device 100. The visual appearance of crown 108 can, but need not, resemble crowns of conventional watches. Buttons 110, 112, and 114, if included, can each be a physical or a touch-sensitive button. That is, the buttons may be, for example, physical buttons or capacitive buttons. Further, body 102, which can include a bezel, may have predetermined regions on the bezel that act as buttons.

Display 106 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Display 106 can allow a user to perform various functions by touching or hovering near the touch sensor panel using one or more fingers or other objects.

In some examples, device 100 can further include one or more pressure sensors (not shown) for detecting an amount of force or pressure applied to the display 106. The amount of force or pressure applied to display 106 can be used as an input to device 100 to perform any desired operation, such as making a selection, entering or exiting a menu, causing the display of additional options/actions, or the like. In some examples, different operations can be performed based on the amount of force or pressure being applied to display 106. The one or more pressure sensors can further be used to determine a position of the force that is being applied to display 106.

Figure 2:
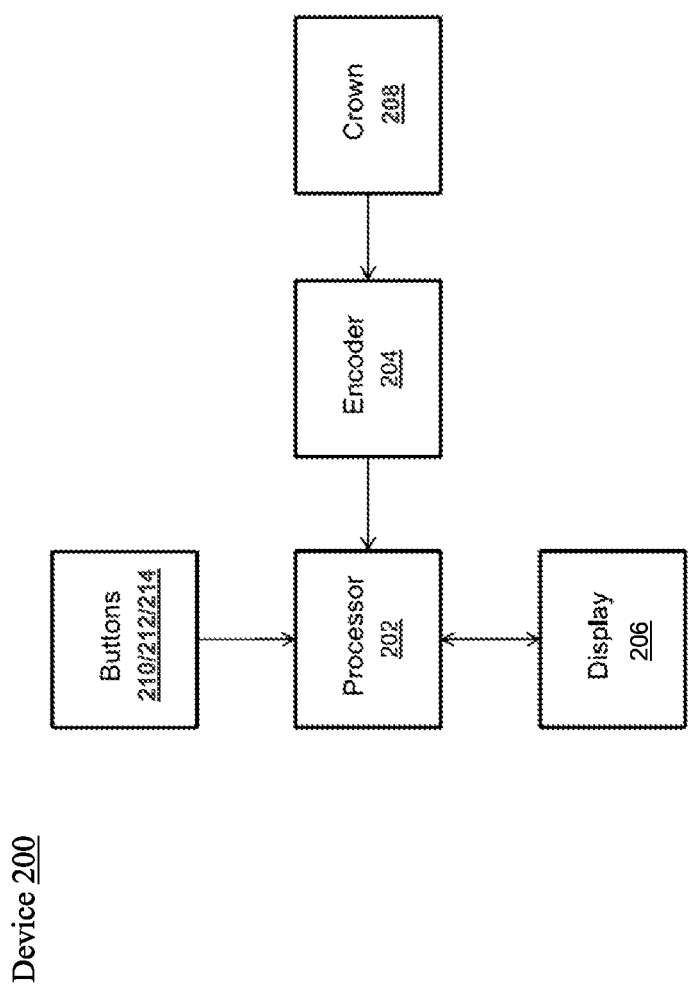
FIG. 2 illustrates an exemplary block diagram of components within an exemplary device according to examples of the disclosure.

FIG. 2 illustrates an exemplary block diagram of components within an exemplary device 200 according to examples of the disclosure. In some examples, crown 208 (which can correspond to crown 108 described above) can be coupled to encoder 204, which can be configured to monitor a physical state or change of physical state of the crown (e.g., the position and/or rotational state of the crown), convert it to an electrical signal (e.g., convert it to an analog or digital signal representation of the position or change in position of the crown), and provide the signal to processor 202. For instance, in some examples, encoder 204 can be configured to sense the absolute rotational position (e.g., an angle between 0-360°) of crown 208 and output an analog or digital representation of this position to processor 202. Alternatively, in other examples, encoder 204 can be configured to sense a change in rotational position (e.g., a change in rotational angle) of crown 208 over some sampling period and to output an analog or digital representation of the sensed change to processor 202. In these examples, the crown position information can further indicate a direction of rotation of the crown 208 (e.g., a positive value can correspond to one direction and a negative value can correspond to the other). In yet other examples, encoder 204 can be configured to detect a rotation of crown 208 in any desired manner (e.g., velocity, acceleration, or the like) and can provide the crown rotational information to processor 202. The rotational velocity can be expressed in numerous ways. For example, the rotational velocity can be expressed as a direction and a speed of rotation, such as hertz, as rotations per unit of time, as rotations per frame, as revolutions per unit of time, as revolutions per frame, as a change in angle per unit of time, and the like. In alternative examples, instead of providing information to processor 202, this information can be provided to other components of device 200, such as, for example, a state machine. While the examples described herein refer to the use of rotational position of crown 208 to control scrolling or scaling of a view, it should be appreciated that any other physical state of the crown can be used to control appropriate actions. For example, tilting (e.g., up-and-down and side-to-side) of crown 208 can be used, for example, to navigate a menu or to interact with a three-dimensional environment displayed on display 206. Accordingly, crown 208 can be used as a three-dimensional input to device 200, provided that the encoder 204 can be configured to sense tilting of the crown. Exemplary sensor arrangements for allowing encoder 204 to sense tilting of the crown will be described in further detail below.

In some examples, the state of the display 206 (which can correspond to display 106 described above) can control physical attributes of crown 208. For example, if display 206 shows a cursor at the end of a scrollable list, crown 208 can have limited motion (e.g., cannot be rotated forward). In other words, the physical attributes of the crown 208 can be conformed to a state of a user interface that is displayed on display 206. In some examples, a temporal attribute of the physical state of crown 208 can be used as an input to device 200. For example, a fast change in physical state can be interpreted differently than a slow change in physical state. These temporal attributes can also be used as inputs to control physical attributes of the crown.

Processor 202 can be further coupled to receive input signals from buttons 210, 212, and 214 (which can correspond to buttons 110, 112, and 114, respectively), along with touch signals from touch-sensitive display 206. Processor 202 can be configured to interpret these input signals and output appropriate display signals to cause an image to be produced by touch-sensitive display 206. While a single processor 202 is shown, it should be appreciated that any number of processors or other computational devices can be used to perform the functions described above.

Figures 3A, 3B:
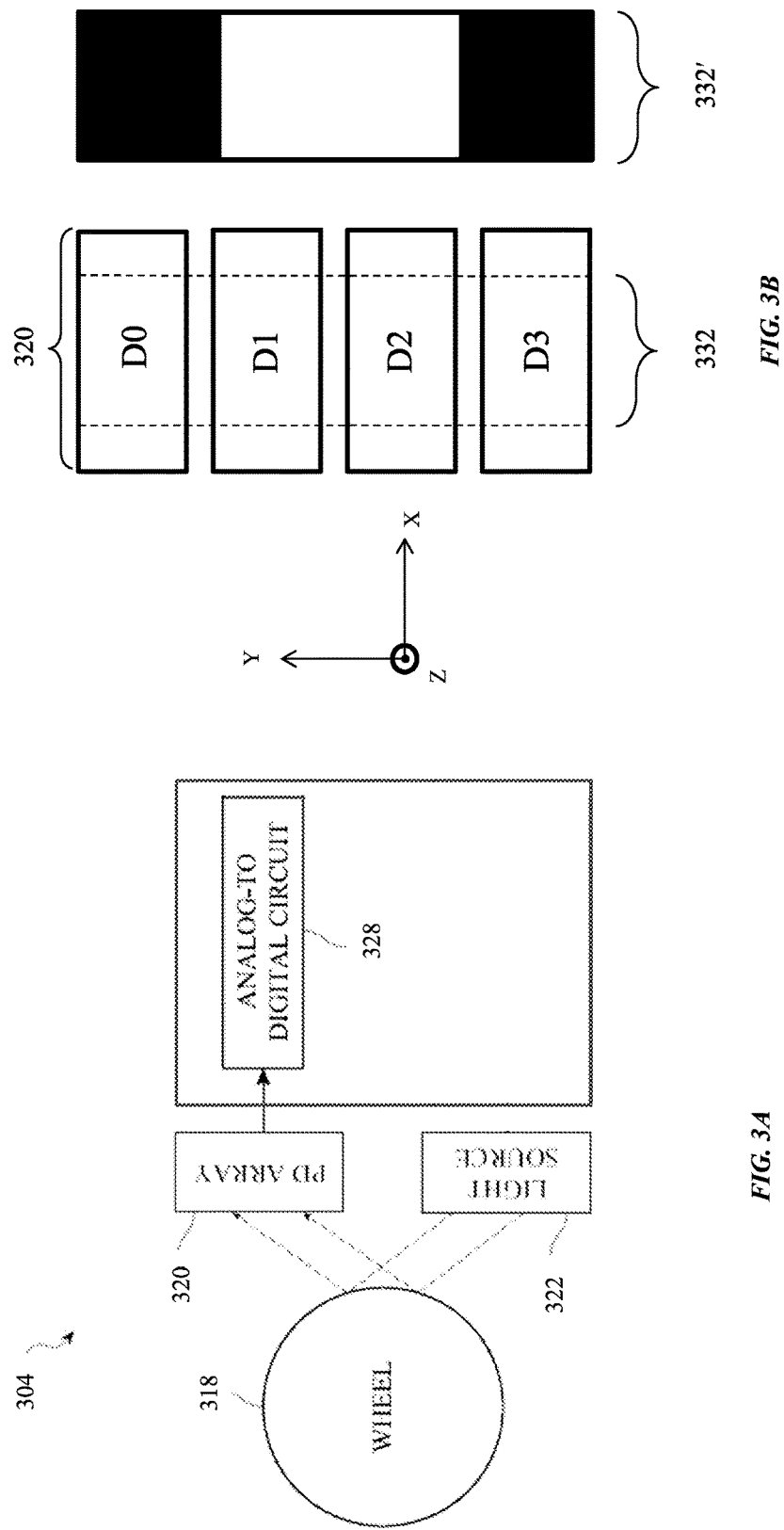
FIG. 3A-3B illustrate components of an optical encoder that can be used to receive crown position information according to examples of the disclosure.

FIG. 3A illustrates an exemplary block diagram of various components of an optical encoder 304 that can be used to receive crown position information according to examples of the disclosure. The optical encoder 304 shown in FIG. 3 may correspond to the encoder 204 described above, or may be used in conjunction with or be a component of the encoder 204 described above. In various electronic devices, rotational and/or axial movement of a component (e.g., crown 108) of the electronic device may need to be determined. In such instances, an optical encoder 304 may be used to detect the rotational movement and the axial movement (e.g., movement of crown 108 away from and toward housing 116) of the component. For example, an optical encoder 304 according to examples of the disclosure can include a light source 322 that shines on a wheel 318 (also referred to as an encoder wheel) or a shaft of the optical encoder. The wheel 318 (or shaft) may include an encoding pattern, such as, for example, a collection of light and dark lines (or stripes, that can be arranged in a particular sequence or in a particular pattern. In some examples, the wheel 318 may be integrated with or attached by a shaft to the crown 108 described above.

When light from the light source 322 hits the encoding pattern, the encoding pattern can modulate the light and reflect it onto one or more sensors 320 associated with the optical encoder. In some examples, the one or more sensors 320 may be an array of photodiodes (PD). As light from the light source 322 is reflected off the wheel 318, one or more photodiodes of the photodiode array 320 can produce an output signal (e.g., voltage or current) value associated with an amount of light received at a given sample time. Once the light is received by the photodiode array 320 at a given time period, an analog-to-digital circuit 328 can convert the analog signal received from the photodiode array to a digital signal. The corresponding digital signals can be processed, and a determination may be made as to the direction, speed and/or movement (rotational and/or axial) of the wheel.

FIG. 3B illustrates an exemplary photodiode array 320 arrangement for detecting rotation of an encoder wheel according to examples of the disclosure. In some examples, the photodiode array 320 can include four photodiode banks, which can comprise individual photodiodes D0-D3. In some examples, individual photodiodes of photodiode array 320 can be formed on a single integrated circuit. Each photodiode D0-D3 can produce an output signal (e.g., voltage or current) value associated with an amount of light received at the respective photodiode. In some examples, the amount of light received at each photodiode can correspond to an amount of area of each respective photodiode D0-D3 that can be covered by a reflection of the encoding pattern (e.g., the collection of light and dark lines arranged in a sequence described above) reflected from wheel 318. The reflection of the encoding pattern when wheel 318 is at its nominal position can be located at position 332. The exemplary location of the reflection position 332 can be indicated by dashed lines spanning the photodiode array 320 in FIG. 3B. For clarity, reflection pattern 332' illustrates an exemplary reflection of a portion of the light and dark line encoding pattern near the photodiode array 320, but it is understood that the reflection pattern can be located at the reflection position 332 spanning the photodiode array 320. For example, the light/white portion of reflection pattern 332' can be located on photodiodes D1 and D2 such that photodiodes D1 and D2 can produce relatively large output signal values. Similarly, the dark/black portion of reflection pattern 332' can be located on photodiodes D0 and D3 such that photodiodes D0 and D3 can produce relatively small output signal values. It is understood that although reflection pattern 332' depicts an abrupt transition between light and dark, in some examples the reflection pattern can transition more gradually. In particular, unless an optical system including light source 322, wheel 318, and photodiode array 320 is designed to produce a focused image at photodiode array 320, the reflection pattern 332' can have an associated blur. In some examples, rotation of the wheel 318 can result in a corresponding shift of reflection pattern 332' (e.g., along the y-axis), which can result in a change in output signal values for photodiodes D0-D3. In some examples, a crown (e.g., crown 108) can be coupled to the wheel 318 such that the changes in output signal values associated with rotation of the wheel can be used to determine a rotation of the crown as described above regarding FIG. 2. In some examples, optical encoder 304 can be configured to provide additional information about the movement of crown 308 (e.g., amount of tilt up-and-down or side-to-side) as will be described in greater detail below. While examples above disclose a photodiode array 320, it is understood that optical encoder 304 can also include a CMOS image sensor, a photovoltaic cell, a photo resistive component, a laser scanner, or other photosensitive sensor configuration.

FIG. 4A illustrates an exemplary force sensor configuration for detecting three-dimensional movement of a crown 408 according to examples of the disclosure. In some examples, crown 408 (which can correspond to crown 108 above) can be coupled to a shaft 426 which can be coupled to an encoder wheel 418 (which can correspond to wheel 318 above). In some examples, the shaft 426 can pass through an opening in a housing 416 (which can correspond to housing 116 above). In some examples, force sensors 424 can be disposed around a perimeter of the opening in housing 416. In some examples, an optical encoder 404 (which can correspond to encoder 304 above) comprising a light source 422 (which can correspond to light source 322 above) and one or more sensors 420 (which can correspond to sensors 320 above) can be used to detect the rotational movement and/or axial movement (i.e., movement along the x-axis) of the crown 408 as described above. In some examples, force sensors 424 can be used to monitor an amount of tilt of the crown 408 in the up-and-down direction (i.e., deflection in the z-axis direction) and in the side-to-side (i.e., deflection in the y-axis direction, which goes into the page) as shown. In some examples, force sensors 424 can be parallel plate capacitors having a compressible insulator (e.g., an elastomer or foam material) disposed between the parallel plates of the capacitors. In some examples, the parallel plate capacitors can be shaped (e.g., curved) to conform to the shape of the opening in housing 416 that shaft 426 passes through. When a force is applied to one or both of the parallel plates, the insulator can be compressed, and the parallel plates can come closer together. A resulting change in capacitance can be measured to determine an amount of force being applied at the force sensors 424 (i.e., a large force can cause a relatively large change in capacitance).

FIG. 4B depicts a cross-sectional view of an exemplary force sensor configuration along line I-I* shown passing through the housing 416 of FIG. 4A. In some examples, the portion of shaft 426 at the location of line I-I* can move in an opposite direction relative to a tilting of the crown 408 (e.g., when crown 408 is tilted down, shaft 426 at line I-I* can move up). FIG. 4B illustrates nine variations 425A-425I of a portion of the cross-section through line I-I* at the opening in housing 416 in FIG. 4A. In some examples, the force sensors 424 can be positioned such that the portion of the shaft 426 at line I-I* can contact the force sensors. In some examples, the force sensors 424 can be positioned such that a portion of the shaft 426 that can move in the same direction as the crown 408 (i.e., near where the shaft couples to the crown) can contact the force sensors. Each of the variations 425A-425I can include a portion of the housing 416 that can be the portion of the housing that can have force sensors 424 mounted within it, and can include shaft 426 passing through the opening 427 in the housing. For simplicity, force sensors 424A-4242D, shaft 426, housing 416, and opening 427 are only labeled once for variation 425B, but it will be understood that each variation 425A-425I can include the force sensors, the shaft, the housing, and the opening. In some examples, there can be four force sensors 424A-424D surrounding opening 427, and each of the four force sensors 424 can be configured to detect a force (or pressure) applied by shaft 426 on one fourth of the perimeter of the opening in housing 416. In some examples, a different number of force sensors 424 can be used in an analogous way to the descriptions below. In some examples, each of the variations 425A-425I can correspond to a different position of the shaft 426 within the opening 427 that can correspond to tilting (i.e., displacement in the y-axis direction, the z-axis direction, or both) of crown 408. Accordingly, each variation 425A-425I can correspond to a location of shaft 426 within the opening of housing 416 that can vary as the shaft is displaced in the y-axis direction and/or the z-axis direction.

In some examples, such as variation 425E, shaft 426 can be in a nominal position (i.e., no external forces applied to the crown and no corresponding tilting of the shaft), such that the shaft does not come in contact with any of the force sensors 424A-424D. In some examples, the displacement of shaft 426 in the directions depicted in variations 425A, 425C, 425G, and 425I can result in a force between shaft 426 and only one sensor (i.e., force sensors 424A, 424D, 424B, and 424C, respectively). In some examples, displacement of shaft 426 in the directions depicted in variations 425B, 425D, 425F, and 425H can result in a force between shaft 426 and two of the force sensors 424A-424D. In one example, as depicted in FIG. 4A, crown 408 can be deflected in a downward tilted position (i.e., displaced in the negative z-axis direction), and as described above, the cross-section of shaft 426 can accordingly move in the positive z-axis direction (i.e., up). The resulting position of shaft 426 can correspond to positions of the shaft 426 depicted in variations 425A-425C, depending on whether the crown is also displaced in the y-axis direction (i.e., side-to-side). In some examples, the crown 408 can be displaced only in the downward (i.e., negative z-axis) direction without any displacement in the side-to-side (i.e., y-axis) direction. Variation 425B can correspond to the resulting upward displacement of shaft 426 in the z-axis direction without any y-axis deflection. In some examples, the displacement of shaft 426 in variation 425B can result in a force between shaft 426 and force sensors 424A and 424D. In some examples, when output signals of force sensors 424A-424D indicate that shaft 426 is contacting force sensors 424A and 424D simultaneously, the force sensor configuration can indicate that the shaft 426 is in the "up" position (and correspondingly that the crown 408 is in the down position). In some examples, a processor or logic (not shown) can determine the direction of deflection of the shaft according to the output values of force sensors 424A-424D as described above. In some examples, as crown 408 is deflected by an increasing amount in the "up" direction, force sensors 424A and 424D can provide a correspondingly increasing force output value. Thus, the amount of force detected by the force sensors 424 can be used to determine the amount of deflection of the crown 408. Accordingly, the outputs of four force sensors 424A-424D can be used to determine at least eight unique positions of the shaft 426 (and eight corresponding directions of crown 408 displacement), in addition to a nominal position of the shaft and crown. In addition to the direction of crown 408 displacement, the force sensors 424 can detect an amount of displacement in the determined direction by measuring the amount of capacitance change associated with a compression of the contacted force sensors as described above. In some examples, such as variations 425B, 425D, 425F, and 425H, two force sensors can each provide information about an amount of force experienced by each respective force sensor 424. In some examples, a relative amount of force detected by each respective force sensor 424 can be used for determining the direction and/or the amount of displacement of crown 408, as opposed to relying only on identification of the force sensor(s) contacted by the shaft for determining the direction of displacement. In some examples, the direction determination can give more weight to a force sensor 424 that detects a greater amount of force. For example, for variation 425B, shaft 426 can contact both force sensors 424A and 424D and compress force sensor 424A twice as much as force sensor 424D (e.g., two-thirds of a contacting portion of the shaft can contact force sensor 424A and one-third of a contacting portion of the shaft can contact force sensor 424D). In some examples, a resulting direction of displacement can be determined based on the relative amounts of force experienced by the contacted force sensors 424 (e.g. by combining the two measurements by ratio or otherwise). While the examples above describe an encoder including four force sensors, in some examples, a different number of force sensors can be used. In some examples, increasing the number of force sensors can correspondingly increase the number of detectable contact positions (and corresponding directions of crown 408 displacement).

In some examples, an optical encoder (e.g., optical encoder 304 above), that can be used to detect rotation of crown 408, can be used in conjunction with force sensors 424 to form a sensing system capable of detecting deflection (i.e. tilt) and rotation of the crown simultaneously. In some examples, any movement of the crown 408 can correspondingly cause movement in the reflected encoding pattern on the photodiode array 420. Movement of the reflected encoding pattern can change the photodiode outputs, and accordingly can be interpreted as a rotational input, regardless of whether any actual rotation of the crown 408 has occurred. In some examples, tilting of crown 408 can result in movement of the encoding pattern reflected from encoder wheel 418 onto photodiode array 420, and accordingly the tilting can be interpreted as rotation. In some examples, this effect can be mitigated by compensating the photodiode outputs of photodiode array 420 for non-rotational movement of the reflected pattern. In some examples, a compensation scheme can be used that utilizes the fact that crown 408 movements (e.g., a sideways tilt with no rotation) can register an output signal at both the optical encoder and the force sensors 424. In some examples, a characteristic amount of movement of the reflected encoding pattern associated with each of the nine positions of shaft 426 in variations 425A-425I (which can be detected by the force sensors 424) can be stored in memory. A processor or logic can be used to subtract (or add) a characteristic amount of movement of the reflected encoding pattern that can be associated with a particular contact state (i.e., a particular measurement from force sensors 424A-424D) from the photodiode array 420 outputs. The result of the subtraction (or addition) can thus remove the tilting component of the movement of the reflected pattern from the photodiode array 420 outputs, and the resulting compensated signal(s) can be used to detect an amount and direction of rotation of the encoder wheel 418 as described above. For example, a sideways tilt of crown 408 with no accompanying rotation can result in movement of the reflected encoding pattern such that the uncompensated photodiode outputs can appear to be consistent with rotation of the crown. The compensation described above can correct the photodiode outputs such that no rotation is detected, in accordance with the input (i.e., sideways tilt of crown 408 with no accompanying rotation) described above. While the examples above describe compensating for tilting components associated with tilting of the crown 408 from the photodiode array 420 outputs, examples below illustrate exemplary configurations for utilizing movement of the reflection pattern (e.g., 332' above) associated with tilting of the crown for detecting three-dimensional movement of the crown.

Figure 5A:
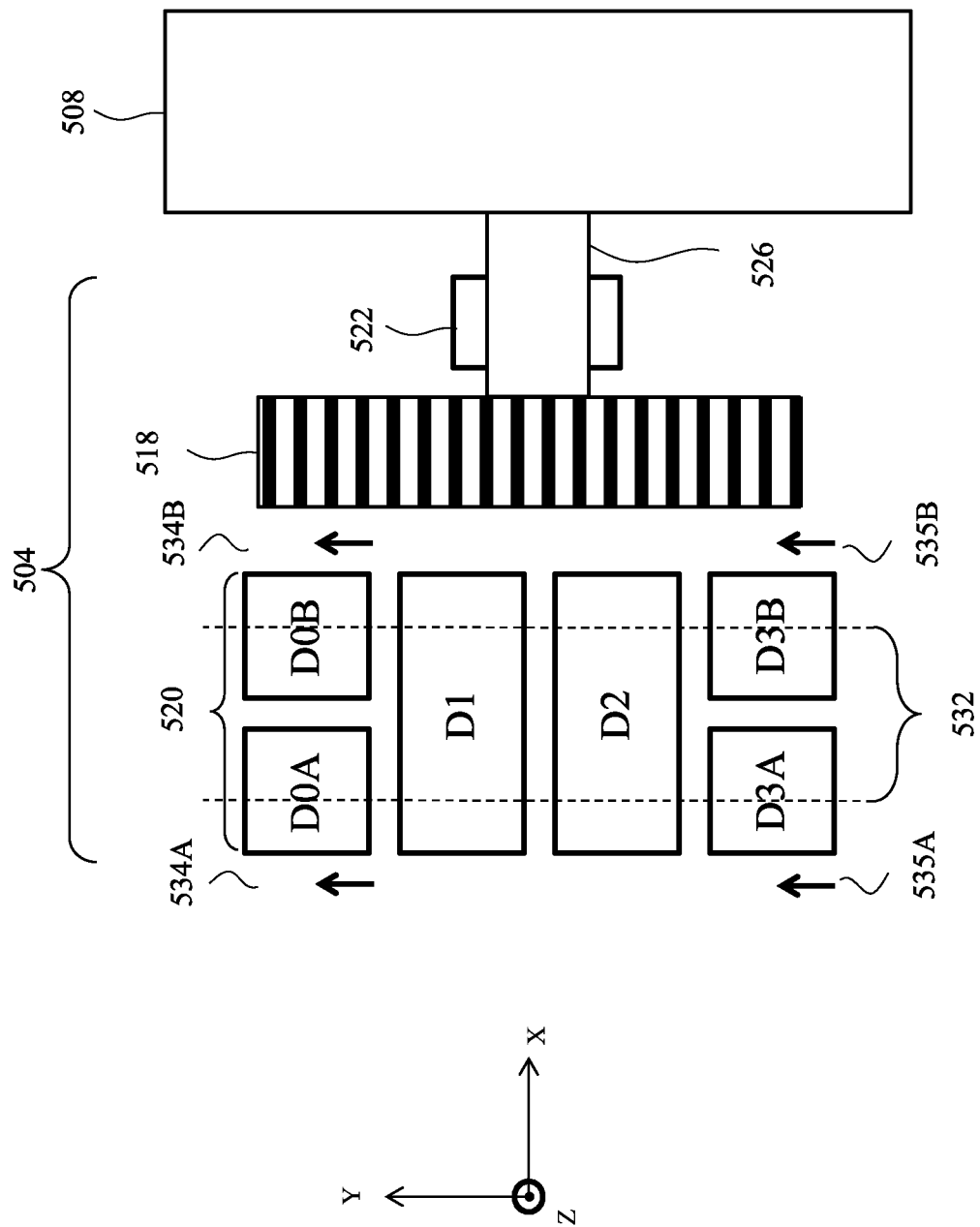
FIGS. 5A-5C illustrate an exemplary top view of an encoder arrangement for detecting three-dimensional movement of a crown according to examples of the disclosure.
Figure 5B:
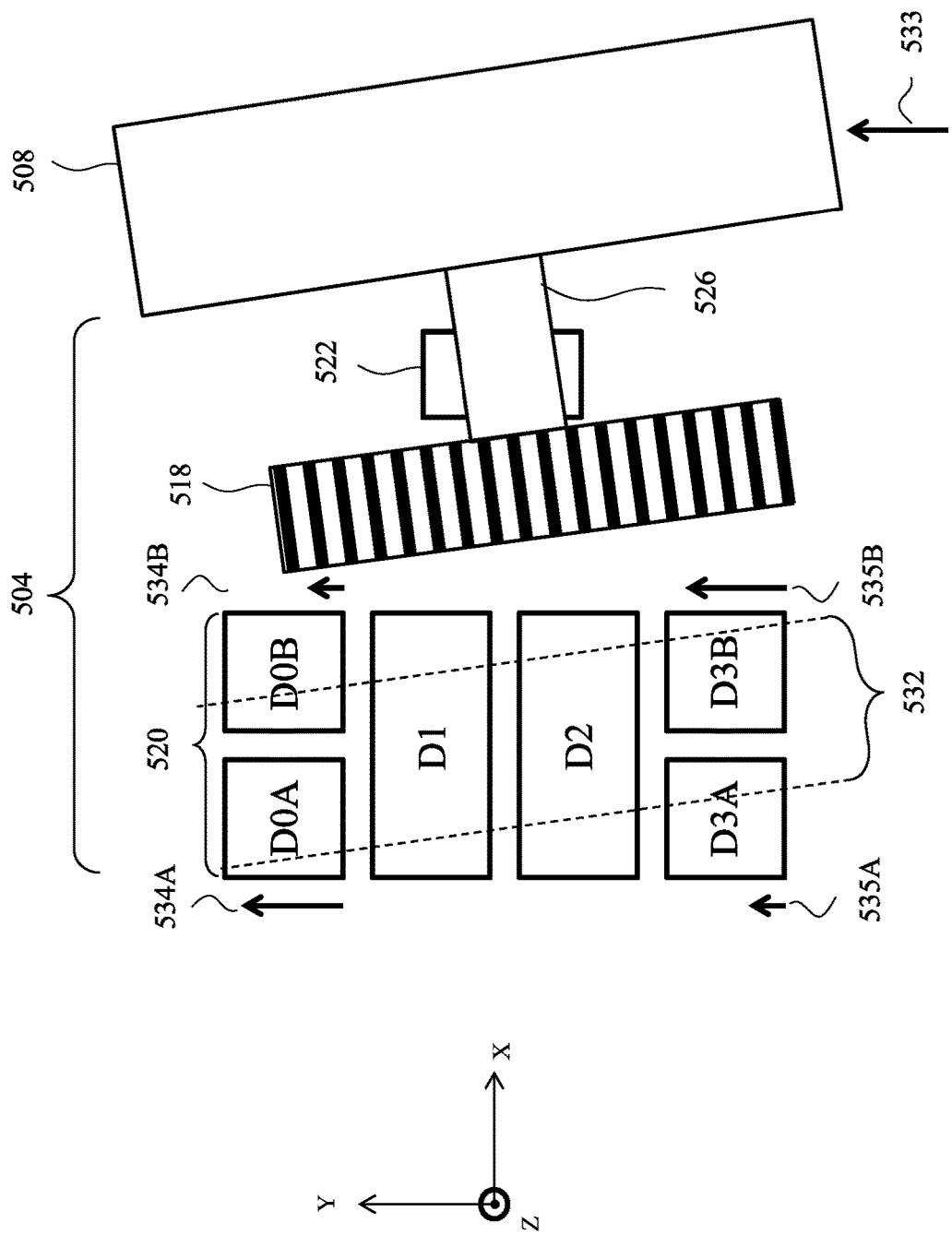
Figure 5C:
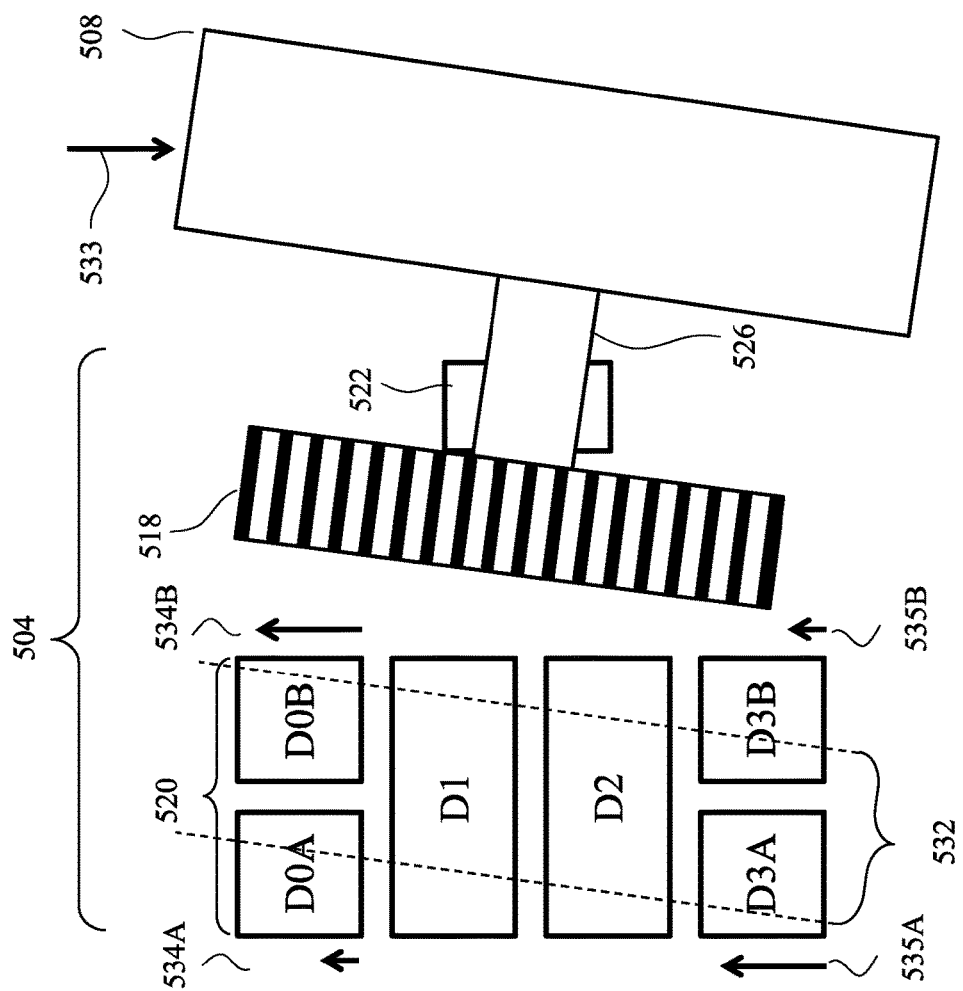

FIG. 5A-5C illustrate an exemplary top view of encoder 504 arrangement (which can correspond to encoder 204) for detecting three-dimensional movement of a crown 508 (which can correspond to crown 108 above) according to examples of the disclosure. In some examples, crown 508 can be coupled to an encoder wheel 518 (which can correspond to wheel 318 above) by a shaft 526 (which can correspond to shaft 326 above). In some examples, the shaft can be used to couple the crown 508 on the outside of a housing (e.g., housing 116 above) to the encoder wheel 518 on the inside of the housing. The encoder 504 can be an optical encoder comprising a light source 522 (which can correspond to light source 322 above), a photodiode array 520 (which can correspond to photodiode array 320 above), and the encoder wheel 518. As explained above, light from the light source 522 can be reflected off the encoder wheel 518 onto the photodiode array 520, and one or more photodiodes of the photodiode array can produce an output signal (e.g., voltage or current) value associated with an amount of light received at a given sample time. In some examples, the photodiode array 520 can include four banks, e.g., D0-D3. In some examples, two or more of the banks of the photodiode array 520 can be further broken into photodiode pairs, for example, photodiode banks D0 and D3 of FIG. 3B can be broken into photodiode pairs D0A/D0B and D3A/D3B, respectively. In some examples, the banks broken into pairs (A/B) can be the banks at each edge of the photodiode array 520. In some examples, breaking the banks at each edge of the photodiode array 520 into pairs can enable detection of three-dimensional movement of the crown 508, as will be described in further detail below. While the examples above describe a photodiode array broken into four banks D0-D3, it is understood that a different number of banks (e.g., three banks, or five or more banks) can be used for detecting three-dimensional movement of the crown 508. Similarly, while the examples above describe breaking banks into pairs, it is understood that some banks can be broken into groupings of three or more sensors for detecting three-dimensional movement of the crown 508. Furthermore, although the examples above describe the banks of photodiode array 520 broken into pairs (or groupings of three or more sensors as described above) at each edge, it is understood that photodiode banks other than the banks at the edge can be broken into pairs (or groupings) and that more than two photodiode banks in the photodiode array can be broken into pairs (or groupings). In some examples, photodiode banks in the photodiode array 520 can be formed on a single integrated circuit. Any of the variations above, or any combination thereof, can be used for detecting three-dimensional movement of crown 508 according to examples of the disclosure.

As further illustrated by FIG. 5A, because encoder wheel 518 can be coupled to crown 508 by a rigid shaft 526, movement of the crown can be captured by measuring movement of the encoder wheel using the encoder arrangement 504. The state of the crown 508 depicted in FIG. 5A can represent a resting, i.e., nominal position, of the crown without any external forces being applied to the crown. Accordingly, the position of encoder wheel 518 in FIG. 5A can represent a state of the crown that is a nominal position for measuring relative movement and/or deflection of the crown in each of the x-axis, the y-axis, and the z-axis (coming out of the page) directions. Accordingly, a reflection position 532 of the encoding pattern onto the photodiode array 520 can be configured to be centered over the photodiode array. The reflection position 532 is illustrated as dotted lines to simplify the visual appearance of the illustration. It is understood that in some examples, the reflection of the encoder wheel 518 (which can be considered an image of the encoder wheel) can also have a light/white and dark/black pattern corresponding to the pattern on the encoder wheel, as previously described. In some examples, the signal output from each of the photodiodes can increase proportionally with the total amount of area of the individual photodiode that is covered by a light section of the reflected encoder wheel 518 pattern. In some examples, the heights of arrows 534A, 534B, 535A, and 535B can be indicative of the amount or intensity of light detected by photodiodes D0A, D0B, D3A, and D3B, respectively. As illustrated in FIG. 5A, in the nominal position, the reflection position 532 can be centered such that the amount of area illuminated by the reflected encoder pattern (and corresponding photodiode signal output values) can be configured to be equal across photodiode pairs (i.e., D0A=D0B and D3A=D3B).

FIG. 5B illustrates an exemplary top view of encoder arrangement 504 for measuring a deflection of crown 508 in the positive y-axis direction that can occur when a force 533 is applied to crown 508 in the positive y-axis direction. In some examples, the force 533 in the positive y-axis direction can cause the crown 508 to deflect in the positive y-axis direction, and can also result in a corresponding rotation (i.e., counter-clockwise as viewed from above) of the crown about the z-axis. In some examples, the reflection position 532 of the encoder wheel 518 reflection can correspondingly rotate about the z-axis. In some examples, this rotation can increase the amount of reflected light incident on photodiodes D0A and D3B and decrease the amount of light incident on photodiodes D0B and D3A relative to the nominal position illustrated in FIG. 5A. To further illustrate the above effect, the heights of arrows 534A, 534B, 535A, and 535B can indicate the amount or intensity of light detected by photodiodes D0A, D0B, D3A, and D3B respectively. Thus, according to the relationships described above, photodiodes expected to increase or decrease together in the presence of deflection of crown 508 in the y-axis direction can be grouped. For example, photodiodes D0A and D3B can be grouped together, and photodiodes D0B and D3A can be grouped together. In some examples, output signals from grouped photodiodes can be aggregated to combine their outputs (i.e., D0A+D3B and D0B+D3A). In some examples, an amount and direction of deflection of the crown in the y-axis direction can be measured by calculating a ratio between the aggregated values. Accordingly, y-axis direction deflection of the crown 508 illustrated in FIG. 5B can be calculated according to the equation:

$$Y=(D0A+D3B)/(D0B+D3A) \tag{1}$$

where Y can be a value indicative of an amount of movement of the crown 508, and D0A, D0B, D3A, and D3B can be signal outputs from the photodiodes D0A, D0B, D3A, and D3B, respectively. In some examples, applying the nominal position (i.e., D0A=D0B and D3A=D3B) described above to eq. (1) can produce a result of Y=1. When applying the example described above for a positive y-axis displacement of crown 508, D0A+D3B (i.e., the numerator of eq. (1)) can increase and D0B+D3A (i.e., the denominator of eq. (1)) can decrease, and the value Y can correspondingly increase. Thus, an increase in the value Y (i.e., Y>1) can correspond to a deflection of crown 508 in the positive y-axis direction.

In some examples (e.g., as illustrated in FIG. 5C), a force 533 in the negative y-axis direction can cause the crown 508 to deflect in the negative y-axis direction, which can also result in a rotation (i.e., clockwise as viewed from above) of the crown about the z-axis. As should be understood from the description above, a deflection of the crown 508 in the negative y-axis direction can cause D0B+D3A (i.e., the denominator of eq. (1)) to increase and cause D0A+D3B (i.e., the numerator of eq. (1)) to decrease. Accordingly when eq. (1) is applied, the value Y can decrease from the nominal value Y=1 such that Y<1. Thus, a value of Y<1 can correspond to a deflection of crown 508 in the negative y-axis direction. Accordingly, it is understood that the encoder arrangement described above can be used to detect deflections of crown 508 in the y-axis direction due to force 533 applied in the y-axis direction. It should also be understood that the while the value Y has been described in terms of an amount and direction displacement of the crown in the y-axis direction above, the value Y can also be used to determine an amount of rotation (i.e., degrees of rotation) of the crown about the z-axis. For example, according to eq. (1), as an amount of rotation of crown 508 in a counter-clockwise (viewed from the top) direction increases (corresponding to increased deflection of the crown in the positive y-axis direction), the value Y can correspondingly increase. Conversely, according to eq. (1), as an amount of rotation of the crown 508 in a clockwise (viewed from the top) direction increases (corresponding to increased deflection of the crown in the negative y-axis direction), the value Y can correspondingly decrease.

It should be noted that although eq. (1) above calculates a value Y as a ratio between aggregated grouped signals, an analogous calculation can be performed by subtracting aggregated grouped signals according to the equation:

$$Y'=(D0A+D3B)-(D0B+D3A) \qquad (2)$$

where Y' can be a value indicative of an amount of movement of the crown 508, and D0A, D0B, D3A, and D3B can be signal outputs from the photodiodes D0A, D0B, D3A, and D3B, respectively. In the nominal position (i.e., D0A=D0B and D3A=D3B), eq. (2) can produce a result of Y'=0. In some examples, a deflection of crown 508 in the positive y-axis direction can cause D0A+D3B to increase relative to the nominal position and can cause D0B+D3A to decrease relative to the nominal position. Accordingly when eq. (2) is applied, the value Y' can increase from the nominal value Y'=0 such that Y'>0. Similarly, deflection of crown 508 in the negative y-axis direction can cause the value Y to decrease from the nominal value such that Y'<0. As explained above, the value Y' can also be used to determine an amount of rotation of the crown about the z-axis. In some examples, the value Y' (or Y) can be converted into an angle of rotation of crown 508 by an algorithm, a look up table, or the like. While FIGS. 5A-5C can describe detection of y-axis direction deflections of a crown using the optical encoder, z-axis direction deflections of the crown 508 can also be detected using the optical encoder 504, as will be described with reference to FIGS. 6A-6C.

Figure 6A:
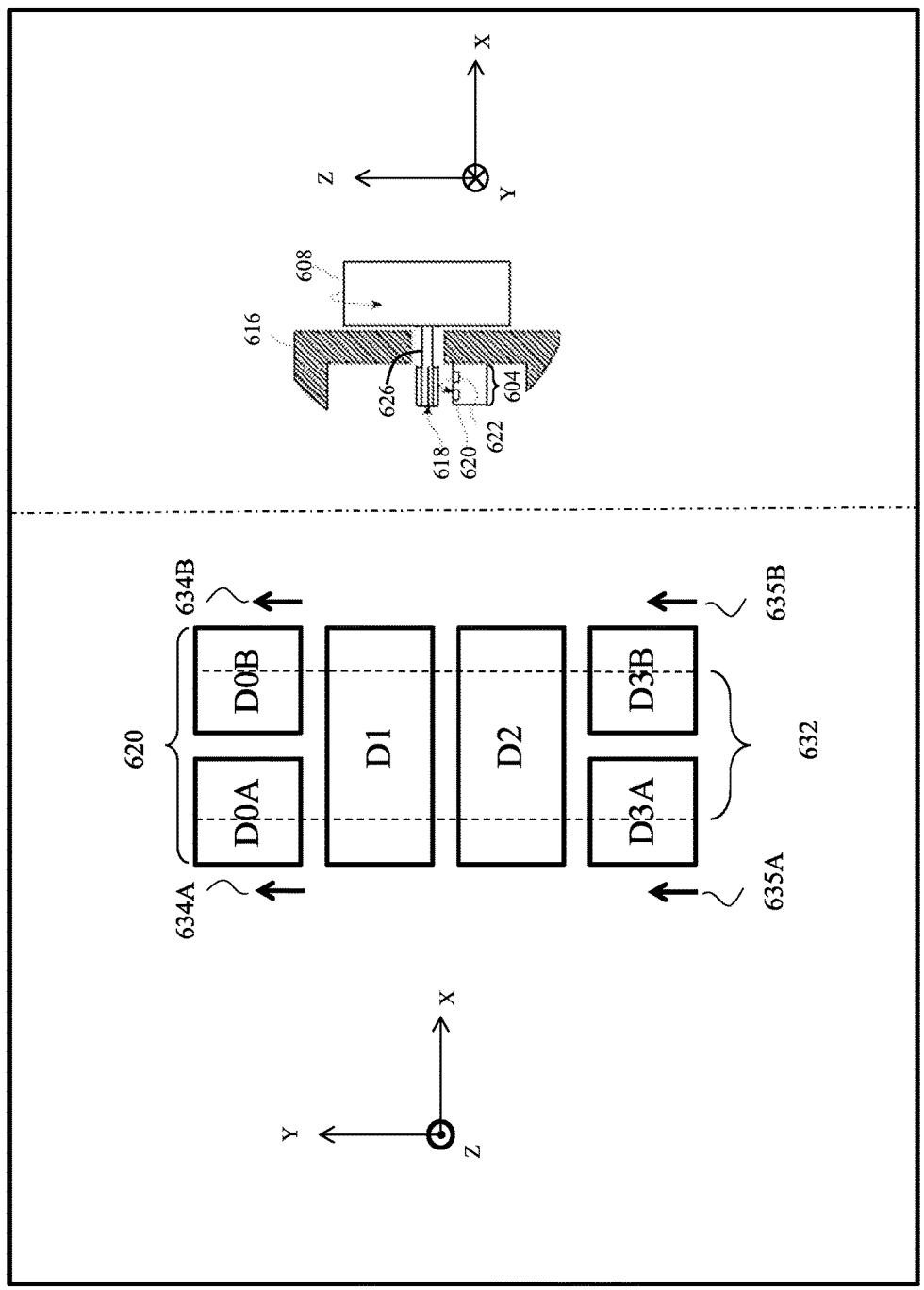
FIGS. 6A-6C illustrate an exemplary encoder arrangement for detecting three-dimensional movement of a crown according to examples of the disclosure.
Figure 6B:
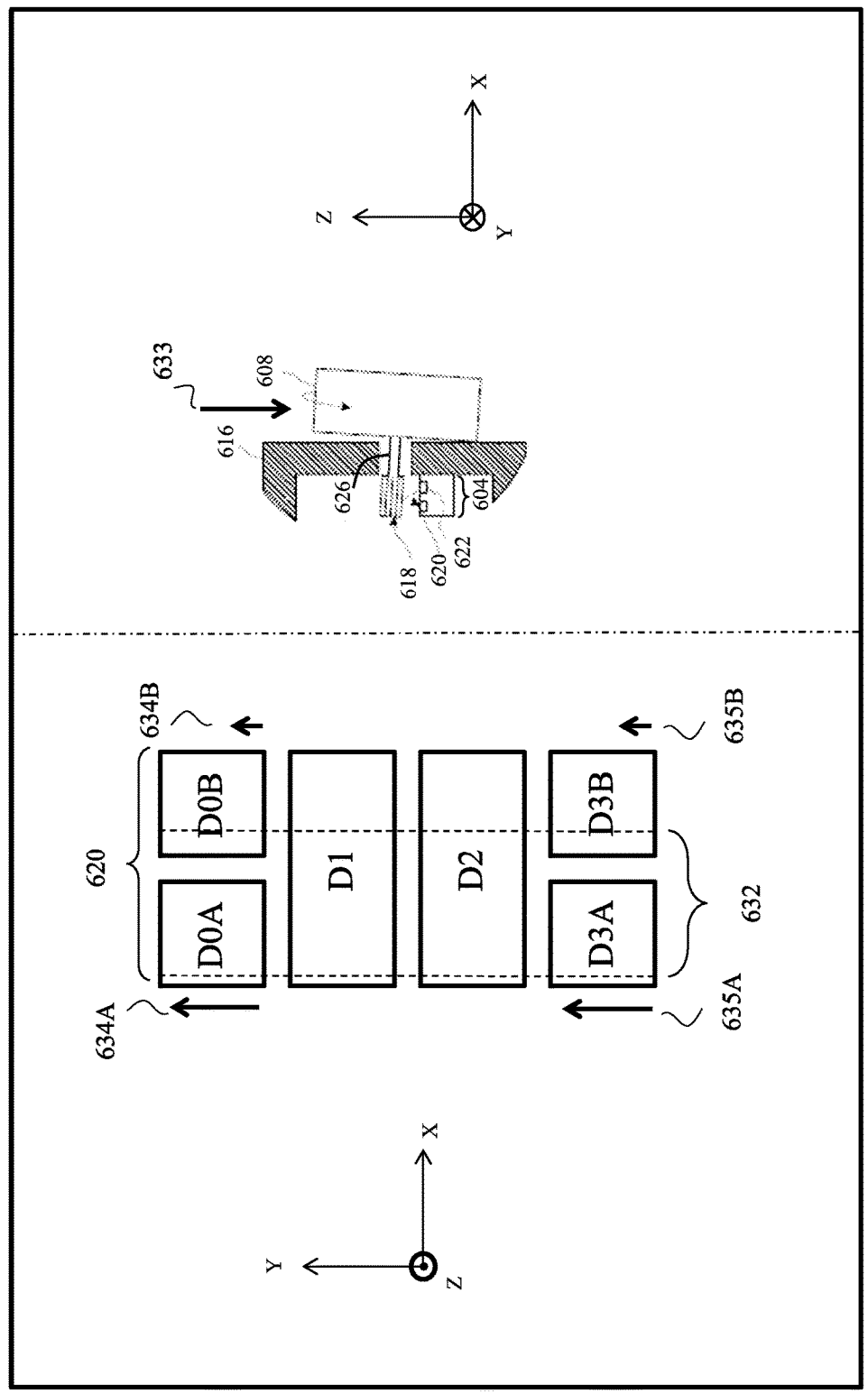
Figure 6C:
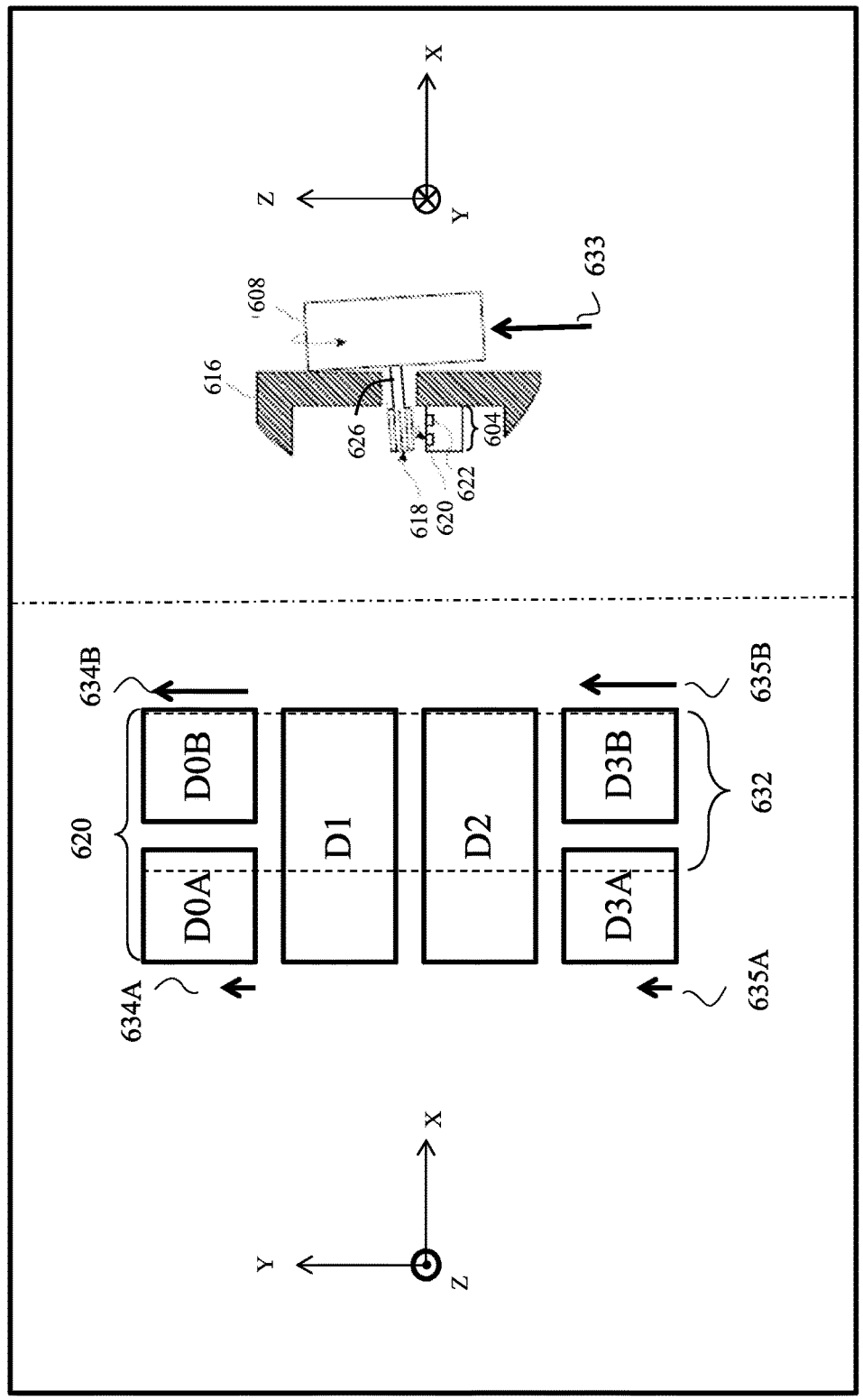

FIGS. 6A-6C illustrate an exemplary encoder 604 arrangement (which can correspond to the encoder 504 arrangement above) for detecting three-dimensional movement of a crown 608 (which can correspond to crown 108 above) according to examples of the disclosure. In FIGS. 6A-6C, the two sets of axes depicted can represent one coordinate system, and the different axes can provide reference orientations for different angle views of illustrated components. For example, the orientation of components shown from a top view can correspond to the set of axes on the left half of the figure with y-axis direction pointing up, and the orientation of components shown from a side view can correspond to the set of axes on the right half of the figure with z-axis direction pointing up. FIG. 6A depicts both a side view of an exemplary encoder 604 arrangement (on the right) and a top view of a reflection position 632 (which can correspond to reflection position 532 above) of the encoder wheel 618 (which can correspond to wheel 318 above) reflection onto the photodiode array 620 (which can correspond to photodiode array 320 above) (on the left). In some examples, photodiode array 620 can be configured according to any of the photodiode arrangement variations or combinations thereof described regarding photodiode array 520 above. In some examples, crown 608 can be coupled to shaft 626 (which can correspond to shaft 426 above) and the shaft can be used to couple encoder wheel 618 to the crown through an opening in the housing 616 (which can correspond to housing 116 above). In some examples, encoder wheel 618 may include an encoding pattern, such as, for example, a collection of light and dark lines that are arranged in a particular sequence or in a particular pattern. In some examples, the position of the encoder wheel 618 illustrated in FIG. 6A can represent the nominal position of the crown without any external forces being applied to the crown, as described above with regards to FIG. 5A. As described above, a reflection position 632 (which can correspond to reflection position 532 above) of the encoding pattern onto the photodiode array 620 can be configured to be centered over the photodiode array. As further described above, in the nominal position, the photodiode signal output values can be configured to be equal across photodiode pairs (i.e., D0A=D0B and D3A=D3B).

FIG. 6B illustrates an exemplary encoder 604 arrangement for measuring a deflection of crown 608 in the negative z-axis direction that can occur when a force 633 (which can correspond to force 533 above) is applied to crown 508 in the negative z-axis direction. In some examples, the force 633 in the negative z-axis direction can cause the crown 608 to deflect in the negative z-axis direction which can also result in a rotation (i.e., clockwise as viewed from the side) of the crown about the y-axis. In some examples, the encoder wheel 618 can experience a corresponding rotation about the y-axis. In some examples, the reflection position 632 of the encoder wheel 618 reflection can correspondingly shift in the negative x-axis direction, as will be described below. Specifically, in some examples, the encoder wheel 618 can have a reflective surface, such that light incident on the encoder wheel can experience specular reflection (i.e., angle of incidence equal to angle of reflection). In some examples, when the encoder wheel 618 rotates about the y-axis (and correspondingly moves away from the photodiode array 620 and light source 622), the angle of incidence (relative to the surface normal) from light transmitted by light source 622 can increase relative to the nominal position, and due to specular reflection, the angle of reflection can also increase. As a result of these geometries, the reflection position 632 can be shifted in the negative x-axis direction relative to the nominal position. The shift of the reflection position 632 can increase the amount of reflected light incident on photodiodes D0A and D3A and decrease the amount of reflected light incident on photodiodes D0B and D3B relative to the nominal position illustrated in FIG. 6A. To further illustrate the above effect, the heights of arrows 634A, 634B, 635A, and 635B can indicate the amount or intensity of light detected by photodiodes D0A, D0B, D3A, and D3B, respectively. Thus, according to the relationships described above, photodiodes expected to output increased or decreased signals together in the presence of a deflection of crown 608 in the z-axis direction can be grouped. For example, photodiodes D0A and D3A can be grouped together, and photodiodes D0B and D3B can be grouped together. In some examples, output signals from grouped photodiodes can be aggregated to combine their outputs (i.e., D0A+D3A and D0B+D3B). In some examples, an amount and direction of deflection of the crown 608 in the z-axis direction can be measured by calculating a ratio between the aggregated values. Accordingly, z-axis deflection in the position of crown 508 illustrated in FIG. 6B can be calculated according to the equation:

$$Z = (D0A + D3A)/(D0B + D3B) \quad (3)$$

where Z can be a value indicative of an amount of movement of the crown 608, and D0A, D0B, D3A, and D3B can be signal outputs from the photodiodes D0A, D0B, D3A, and D3B, respectively. In some examples, applying the nominal position (i.e., D0A=D0B and D3A=D3B) described above to eq. (3) can produce a result of Z=1. When applying the example described above for a negative z-axis displacement of crown 608, D0A+D3A (i.e., the numerator) can increase and D0B+D3B (i.e., the denominator) can decrease, and the value Z can correspondingly increase. Thus, an increase in the value Z (i.e., Z>1) can correspond to a deflection of crown 508 in the negative z-axis direction. It should be understood that in some examples, displacement of the crown 608 in the negative x-axis direction (i.e. toward the housing 616) can result in a shift in the reflection position 632 of the encoder wheel 618 reflection similar to the shift depicted in FIG. 6B and described above. In some examples, displacement of the crown 608 in the x-axis direction can be distinguished from displacement of the crown 608 in the z-axis direction based on a change in magnification of the encoder pattern, which will described in further detail below.

In some examples (e.g., as illustrated in FIG. 6C), a force 633 in the positive z-axis direction can cause the crown 608 to deflect in positive z-axis direction and rotate in the counter-clockwise direction (as viewed from the side) about the y-axis. As should be understood from the description above, a force 633 in the positive z-axis direction can cause D0B+D3B (i.e., the denominator of eq. (3)) to increase and cause D0A+D3A (i.e., the numerator of eq. (3)) to decrease. Accordingly when eq. (3) is applied, the value Z can decrease from the nominal value Z=1 such that Z<1. Thus, a value of Z<1 can be associated with a deflection of crown 608 in the positive z-axis direction. Accordingly, it is understood that the encoder arrangement described above can be used to detect deflections of crown 608 in the z-axis direction due to force 633 applied in the z-axis direction. It should also be understood that the while the value Z has been described in terms of an amount and direction displacement of the crown in the z-axis direction above, the value Z can also be used to determine an amount of rotation (i.e., degrees of rotation) of the crown about the y-axis. For example, according to eq. (3), as an amount of rotation of crown 608 in a clockwise (viewed from the side) direction increases (corresponding to increased deflection of the crown in the negative z-axis direction), the value Z can correspondingly increase. Conversely, according to eq. (3), as an amount of rotation of the crown 608 in a counter-clockwise (viewed from the side) direction increases (corresponding to increased deflection of the crown in the positive z-axis direction), the value Z can correspondingly decrease.

It should be noted that although eq. (3) above calculates a value Z as a ratio between aggregated grouped signals, an analogous calculation can be performed by subtracting aggregated grouped signals according to the equation:

$$Z' = (D0A + D3A) - (D0B + D3B) \quad (4)$$

where Z' can be a value indicative of y-axis deflection, and D0A, D0B, D3A, and D3B can be signal outputs from the photodiodes D0A, D0B, D3A, and D3B, respectively. In the nominal position (i.e., D0A=D0B and D3A=D3B), eq. (4) can produce a result of Z'=0. In some examples, a deflection of crown 608 in the negative z-axis direction can cause D0A+D3A to increase relative to the nominal position and can cause D0B+D3B to decrease relative to the nominal position. Accordingly when eq. (4) is applied, the value Z' can increase from the nominal value Z'=0 such that Z'>0. Similarly, a deflection of crown 608 in the positive z-axis direction can cause Z' to decrease from the nominal value such that Z'<0. As explained above, the value Z' can also be used to determine an amount of rotation of the crown about the z-axis. In some examples, the value Z' (or Z) can be converted into an angle of rotation of crown 508 by an algorithm, a look up table, or the like. It should be understood that in some examples, displacement of the crown 608 in the positive x-axis direction (i.e. away from the housing 616) can result in a shift in the reflection position 632 of the encoder wheel 618 reflection similar to the shift depicted in FIG. 6C and described above. In some examples, displacement of the crown 608 in the x-axis direction can be distinguished from displacement of the crown in the z-axis direction based on a change in magnification of the encoder pattern, which will described in further detail below.

Figure 7A:
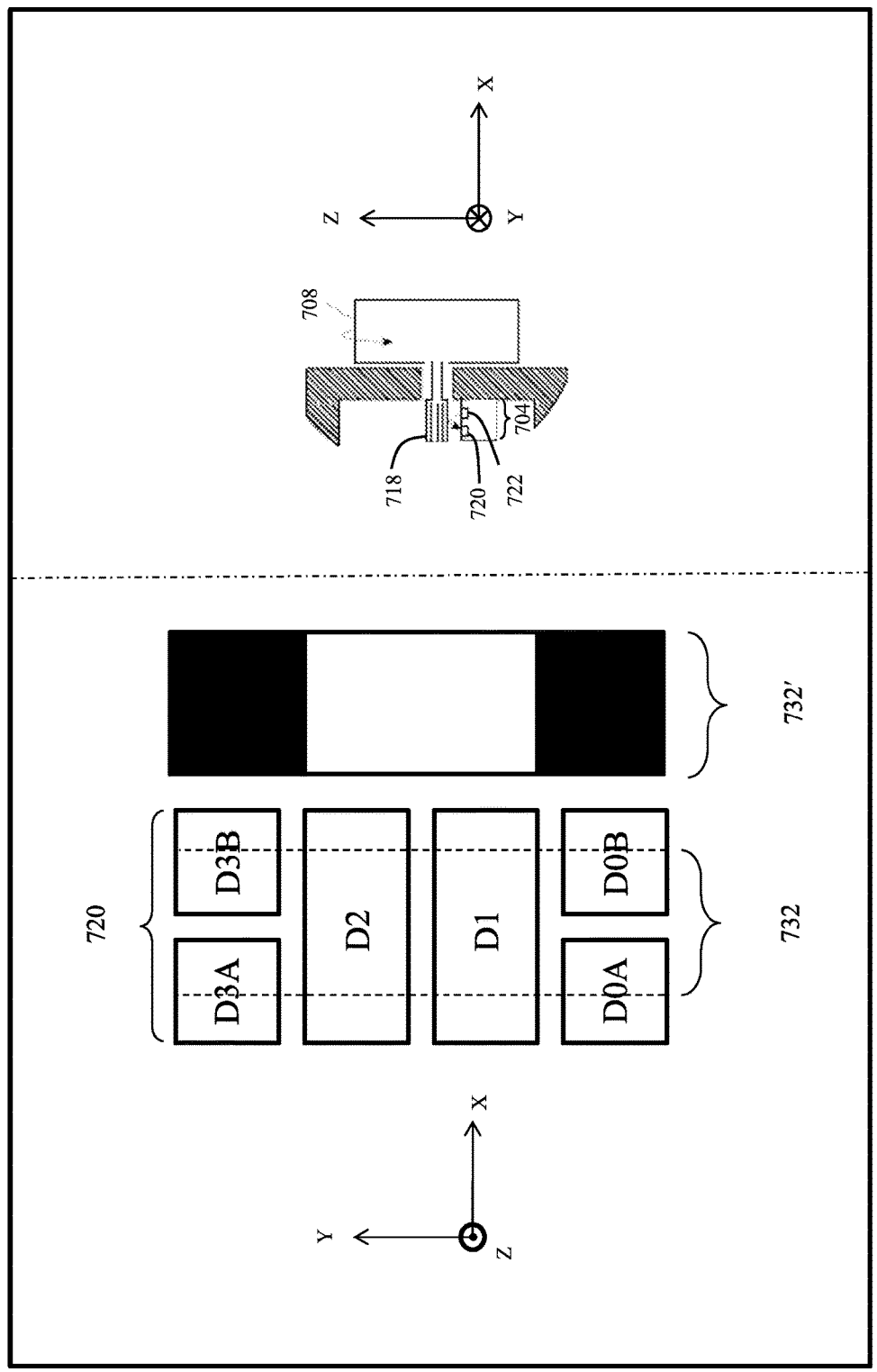
FIGS. 7A-7C illustrate a technique for using a magnification effect of a reflection pattern for detecting three-dimensional movement of a crown according to examples of the disclosure.
Figure 7B:
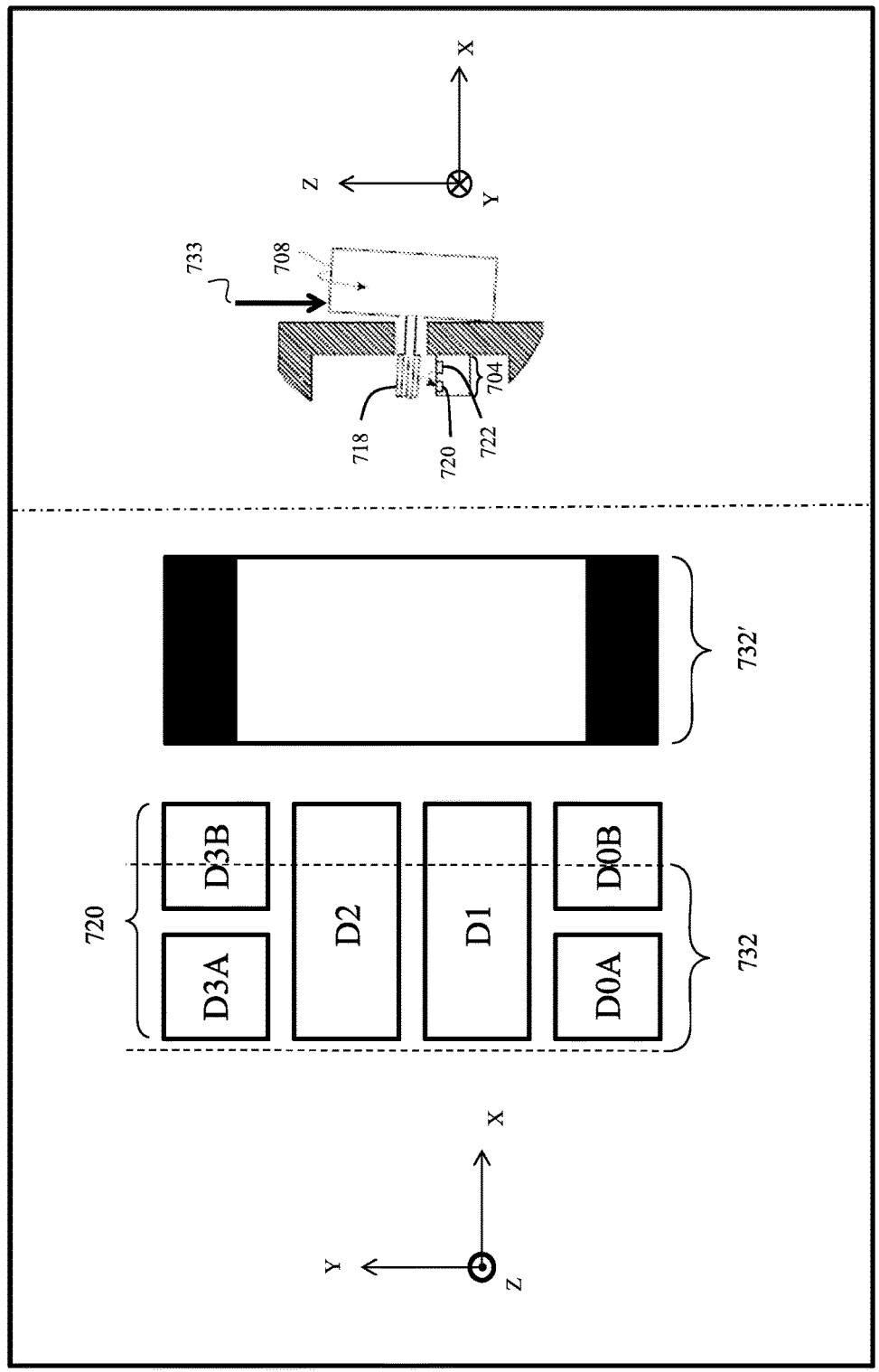
Figure 7C:
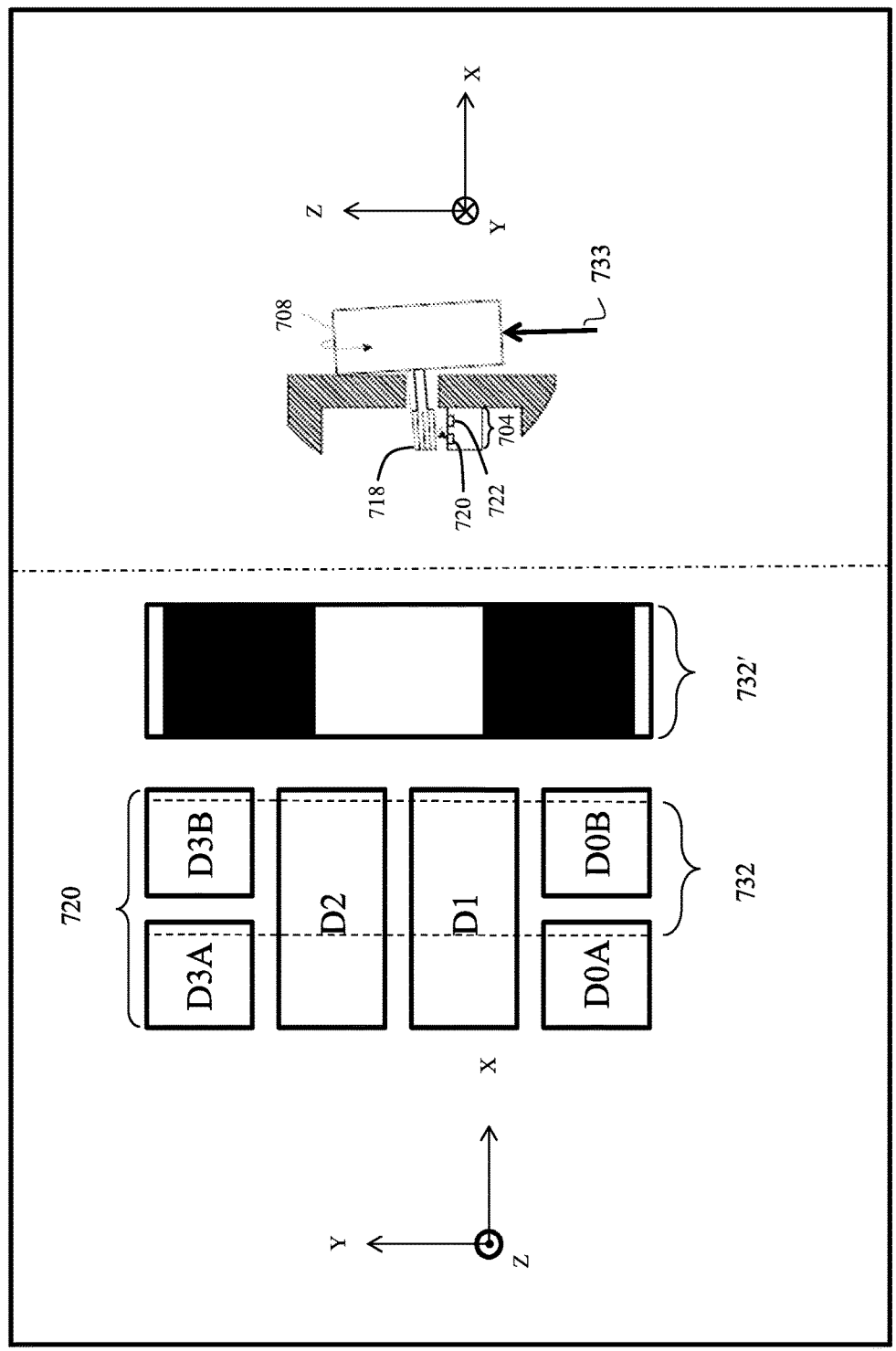

Additionally or alternatively to the z-axis direction crown deflection detection described with reference to FIGS. 6A-6C, a magnification effect of an encoding pattern on the shaft of the crown can be used to determine z-axis direction deflection of the crown. FIGS. 7A-7C illustrate a technique for using a magnification effect of a reflection pattern for detecting three-dimensional movement of a crown according to examples of the disclosure. Specifically, FIGS. 7A-7C illustrate a magnification effect of a reflection pattern 732' that can be used for detecting deflection of a crown 608 in the z-axis direction. In FIGS. 7A-7C, the two sets of axes depicted can represent one coordinate system, and the different axes can provide reference orientations for different angle views of illustrated components. For example, the orientation of components shown from a top view can correspond to the set of axes on the left half of the figures with y-axis direction pointing up, and the orientation of components shown from a side view can correspond to the set of axes on the right half of the figures with z-axis direction pointing up. FIG. 7A illustrates a top view of photodiode array 720 (which can correspond to photodiode array 620) and reflection position 732 (which can correspond to reflection position 632 above). Reflection pattern 732' can be a reflection of an encoding pattern (e.g., light and dark stripes) disposed on encoder wheel 718 (which can correspond to encoder wheel 318 above), as previously described. In some examples, light stripes can correspond to the white portions of the reflection pattern 732' and dark stripes can correspond to the black portions of the reflection pattern.

Reflection position 732 and reflection pattern 732' can be associated with a nominal position of crown 708, as described in FIG. 6A above. In some examples, light incident on encoder wheel 718 can be reflected from a curved surface of the encoder wheel. Thus, the reflection pattern 732', which can be considered an image of the encoding pattern disposed on wheel 714, can have a magnification factor that can be a function of the curvature of the encoder wheel 718 and the distances between the light source 722 (which can correspond to light source 422 above), the photodiode array 720, and the encoder wheel. Accordingly, a size of the reflection pattern 732' can be determined based on the dimensions of the pattern on the encoding wheel 718 and the magnification factor associated with the distances between the above components of optical encoder 704 (which can correspond to optical encoder 404 above). Thus, because the crown 708 can be coupled to the encoder wheel 718, the size of reflection pattern 732' (i.e., width and height of the light and dark stripes) can also be associated with the position of crown 708, and in particular the dimensions of pattern 732' in FIG. 7A can be associated with the nominal position of the crown.

FIG. 7B illustrates an exemplary reflection position 732 and reflection pattern 732' that can be associated with a crown 708 displaced in the negative z-axis direction by a force 733 in the negative z-axis direction as described in FIG. 6B. As a result, the reflection position 732 can correspondingly move in the negative x-axis direction such that the amount of light on photodiodes D0A and D3A can increase while the amount of light on photodiodes D0B and D3B can decrease as described regarding FIG. 6B above. In some examples, corresponding rotation of the encoder wheel 718 about the y-axis can move the curved surface of the encoder wheel away from the photodiode array 720. In some examples, the corresponding change of distances between the components of the optical encoder 704 due to the above movement of encoder wheel 718 can result in an increased magnification factor of the reflected pattern 732'. Specifically, the magnification factor can increase when the curved surface of the encoder wheel 718 moves away from the light source 722 and photodiode array 720 relative to the nominal position described above in FIG. 7A. When compared with the reflection pattern 732' for the nominal position above, the light stripe can be magnified according to the increased magnification factor. In some examples, the amount of magnification increase of the reflection pattern 732' can change the photodiode signal outputs (i.e., more photodiodes can simultaneously detect a larger light stripe). For example, as compared with FIG. 7A, photodiodes D0A, D0B, D3A and/or D3B can detect more light, because the light stripe in the magnified reflection pattern 732' of FIG. 7B can be incident on those photodiodes, where it may not have been in FIG. 7A. Thus, the increased size of the reflection pattern 732' can be used to determine the amount of deflection of the crown 708 in the negative z-axis direction resulting from the negative z-axis direction force 733. In some examples, the same information can be used to determine an angle of rotation of the crown 708 about the y-axis, as described above. In some examples, the increased size of the reflection pattern 732' can be used in conjunction with the shifting of the reflection position 732 in the x-axis direction as described above regarding FIG. 6B to determine the amount of deflection of the crown 708 in the negative z-axis direction (and/or angle of rotation about the y-axis) resulting from the negative z-axis direction force 733.

FIG. 7C illustrates an exemplary reflection position 732 and reflection pattern 732' that can be associated with a crown 708 displaced in the positive z-axis direction by a force 733 in the positive z-axis direction as described in FIG. 6C. As a result, the reflection position 732 can correspondingly move in the positive x-axis direction such that the amount of light on photodiodes D0A and D3A can decrease while the amount of light on photodiodes D0B and D3B can increased as described regarding FIG. 6C above. In some examples, corresponding rotation of the encoder wheel 718 about the y-axis can move the curved surface of the encoder wheel toward the photodiode array 720. In some examples, the corresponding change of distances between the components of the optical encoder 704 due to the above movement of encoder wheel 718 can result in an increased magnification factor of the reflected pattern 732'. The magnification factor can decrease when the curved surface of the encoder wheel 718 moves closer to the light source 722 and photodiode array 720 relative to the nominal position described above in FIG. 7A. In some examples, the decreased magnification can correspondingly result in multiple light stripes appearing within the reflection pattern 732. In some examples, the amount of magnification decrease of the reflection pattern 732' can change the photodiode signal outputs (e.g., multiple light stripes can be detected at once). Thus, the decreased size of the reflection pattern 732' can be used to determine the amount of deflection of the crown in the positive z-axis direction 708 resulting from the positive z-axis direction force 733. In some examples, the same information can be used to determine an angle of rotation of the crown 708 about the y-axis, as described above. In some examples, the decreased size of the reflection pattern 732' can be used in conjunction with the shifting of the reflection position 732 in the x-axis direction, as described above regarding FIG. 6C, to determine the amount of deflection of the crown 708 in the positive z-axis direction (and/or angle of rotation about the y-axis) resulting from the positive z-axis direction force 733.

Figure 8:
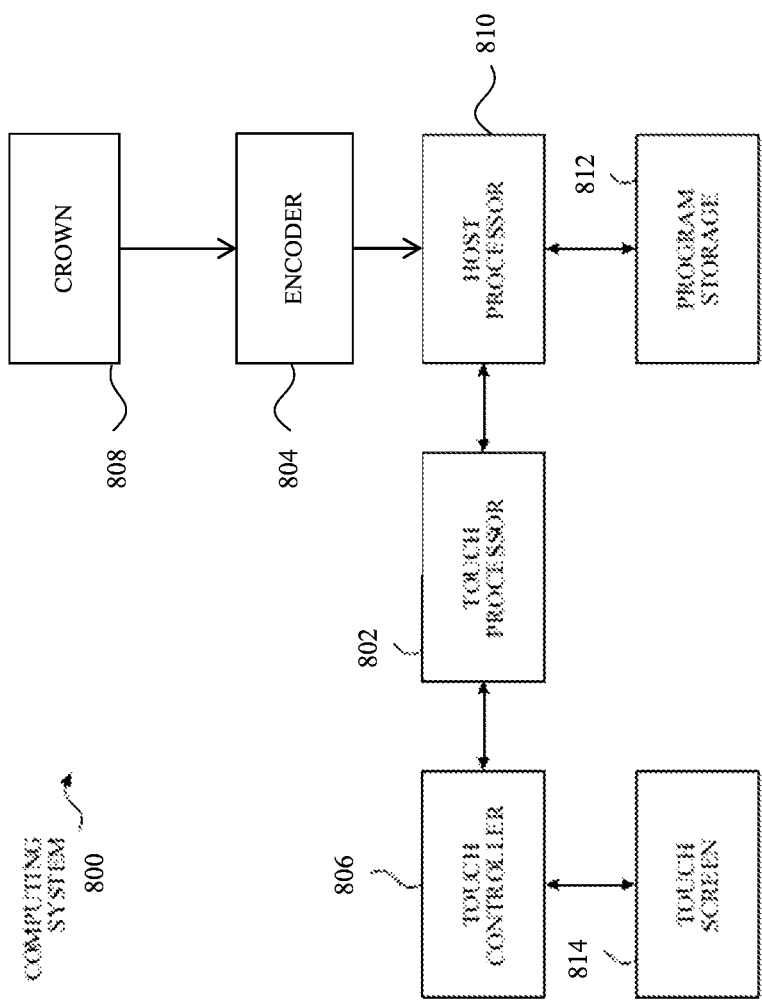
FIG. 8 illustrates an example computing system for implementing three-dimensional input sensing according to examples of the disclosure.

FIG. 8 illustrates an example computing system 800 for implementing three-dimensional input sensing according to examples of the disclosure. Computing system 800 can be included in, for example, electronic device 100 or any mobile or non-mobile computing device and/or wearable device that includes a crown 808 (which can correspond to crown 108 above). Computing system 800 can include a touch sensing system including one or more touch processors 802, touch controller 806 and touch screen 814. Touch screen 814 can be a touch screen adapted to sense touch inputs, as described in this disclosure. Touch controller 806 can include circuitry and/or logic configured to sense touch inputs on touch screen 814. In some examples, touch controller 806 and touch processor 802 can be integrated into a single application specific integrated circuit (ASIC).

Computing system 800 can also include host processor 810 for receiving outputs from touch processor 802 and performing actions based on the outputs. Host processor 810 can be connected to program storage 812. For example, host processor 810 can contribute to generating an image on touch screen 814 (e.g., by controlling a display controller to display an image of a user interface (UI) on the touch screen), and can use touch processor 802 and touch controller 806 to detect one or more touches on or near touch screen 814. Host processor 810 can also contribute to sensing and/or processing mechanical inputs (e.g., rotation, tilting, displacement, etc.) from a crown 808 (which can be a type of mechanical input mechanism) that can be detected by an encoder 804 (which can correspond to encoder 204 above). The touch inputs from touch screen 814 and/or mechanical inputs from the crown 808 can be used by computer programs stored in program storage 812 to perform actions in response to the touch and/or mechanical inputs. For example, touch inputs can be used by computer programs stored in program storage 812 to perform actions that can include moving an object such as a cursor or pointer, scrolling or panning, adjusting control settings, opening a file or document, viewing a menu, making a selection, executing instructions, operating a peripheral device connected to the host device, answering a telephone call, placing a telephone call, and other actions that can be performed in response to touch inputs. Mechanical inputs from a mechanical input mechanism can be used by computer programs stored in program storage 812 to perform actions that can include changing a volume level, locking the touch screen, turning on the touch screen, taking a picture, navigating through three-dimensional menus and environments, and other actions that can be performed in response to mechanical inputs. Host processor 810 can also perform additional functions that may not be related to touch and/or mechanical input processing.

Note that one or more of the functions described above can be performed by firmware stored in memory in computing system 800 and executed by touch processor 802, or stored in program storage 812 and executed by host processor 810. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Therefore, according to the above, some examples of the disclosure are directed to an apparatus comprising: a mechanical input mechanism comprising a rotatable shaft; and an optical sensor configured to: detect a rotation of the shaft; and detect a movement of the shaft toward or away from the optical sensor. Additionally or alternatively to one or more of the examples disclosed above, in some examples, detecting the movement of the shaft toward or away from the optical sensor is based on a change in a magnification of an image of the shaft on the optical sensor. Additionally or alternatively to one or more of the examples disclosed above, in some examples, a pattern is disposed on the shaft, and the change in the magnification of the image of the shaft is determined based on a change in a size of an image of at least a portion of the pattern. Additionally or alternatively to one or more of the examples disclosed above, in some examples, the optical sensor is further configured to detect light incident on the optical sensor, and detect the movement of the shaft toward or away from the optical sensor based on a change in a position of the light incident on the optical sensor. Additionally or alternatively to one or more of the examples disclosed above, in some examples, the optical sensor includes a first sensor arrangement having a first position and a second sensor arrangement having a second position, and detecting movement of the shaft toward or away from the optical sensor is based on a relationship between a first amount of detected light incident on the first sensor arrangement and a second amount of detected light incident on the second sensor arrangement.

Some examples of the disclosure are directed to an apparatus comprising: a mechanical input mechanism comprising a rotatable shaft; and an optical sensor configured to: detect light incident on the optical sensor, the light having a position and an orientation, the orientation of the light based on at least a position of the rotatable shaft; detect a rotation of the shaft; and detect a movement of the shaft based on at least a change in the orientation of the light. Additionally or alternatively to one or more of the examples disclosed above, in some examples, the optical sensor includes a first sensor arrangement and a second sensor arrangement, and detecting movement of the shaft is based on a relationship between a first amount of detected light incident on the first sensor arrangement and a second amount of detected light incident on the second sensor arrangement. Additionally or alternatively to one or more of the examples disclosed above, in some examples, the first sensor arrangement has a first sensor orientation corresponding to a first orientation of the light and the second sensor arrangement has a second sensor orientation corresponding to a second orientation of the light, the first amount of detected light greater than the second amount of detected light corresponds to the first orientation of the light, and the second amount of detected light greater than the first amount of detected light corresponds to the second orientation of the light. Additionally or alternatively to one or more of the examples disclosed above, in some examples, the first sensor arrangement comprises a plurality of first sensor elements disposed along a first diagonal direction and the second sensor arrangement comprises a plurality of second sensor elements, different from the first sensor elements, disposed along a second diagonal direction, different from the first diagonal direction. Additionally or alternatively to one or more of the examples disclosed above, in some examples, the optical sensor is further configured to detect a movement of the shaft toward or away from the optical sensor based on a change in a magnification of an image of the shaft on the optical sensor. Additionally or alternatively to one or more of the examples disclosed above, in some examples, the optical sensor is further configured to detect a movement of the shaft toward or away from the optical sensor based on a change in the position of the light.

Some examples of the disclosure are directed to an apparatus comprising: a housing; a mechanical input mechanism comprising a rotatable shaft coupled to the housing and configured to contact a force sensor coupled to the housing in response to a user input, wherein the force sensor is configured to: detect a position of the shaft; and detect an amount of force between the shaft and the force sensor that is based on the user input. Additionally or alternatively to one or more of the examples disclosed above, in some examples, the force sensor is associated with a direction of input, and the amount of force between the shaft and the force sensor corresponds to a magnitude of the user input in the direction of input. Additionally or alternatively to one or more of the examples disclosed above, in some examples, the apparatus further comprises a second force sensor associated with a second direction of input, different from the first direction of input, wherein a resulting detected magnitude of the user input in a specified direction is based on respective amounts of force between the shaft and each of the force sensor and the second force sensor. Additionally or alternatively to one or more of the examples disclosed above, in some examples, the housing includes an opening through which the rotatable shaft is coupled to the housing, and the force sensor is disposed within the opening.

Some examples of the disclosure are directed to a method comprising the steps of: detecting light incident on an optical sensor; detecting a rotation of a mechanical input mechanism comprising a rotatable shaft; and detecting a movement of the shaft toward or away from the optical sensor based on the detected light. Additionally or alternatively to one or more of the examples disclosed above, in some examples, detecting the movement of the shaft toward or away from the optical sensor is based on a change in a magnification of an image of the shaft on the optical sensor. Additionally or alternatively to one or more of the examples disclosed above, in some examples, a pattern is disposed on the shaft, and the change in the magnification of the image of the shaft is determined based on a change in a size of an image of at least a portion of the pattern. Additionally or alternatively to one or more of the examples disclosed above, in some examples, the method further comprises detecting a movement of the shaft based on at least a change in an orientation of the light incident on the optical sensor: Additionally or alternatively to one or more of the examples disclosed above, in some examples, the optical sensor includes a first sensor arrangement having a first position and a second sensor arrangement having a second position, and detecting movement of the shaft toward or away from the optical sensor is based on at least a relationship between a first amount of detected light incident on the first sensor arrangement and a second amount of detected light incident on the second sensor arrangement.

Some examples of the disclosure are directed to a method comprising the steps of: detecting light incident on an optical sensor, the light having a position and an orientation, the orientation of the light based on at least a position of a mechanical input mechanism comprising a rotatable shaft; detecting a rotation of the shaft; and detecting a movement of the shaft based on at least a change in the orientation of the light. Additionally or alternatively to one or more of the examples disclosed above, in some examples, the optical sensor includes a first sensor arrangement and a second sensor arrangement, and detecting movement of the shaft is based on at least a relationship between a first amount of detected light incident on the first sensor arrangement and a second amount of detected light incident on the second sensor arrangement. Additionally or alternatively to one or more of the examples disclosed above, in some examples, the first sensor arrangement has a first sensor orientation corresponding to a first orientation of the light and the second sensor arrangement has a second sensor orientation corresponding to a second orientation of the light, the first amount of detected light greater than the second amount of detected light corresponds to the first orientation of the light, and the second amount of detected light greater than the first amount of detected light corresponds to the second orientation of the light. Additionally or alternatively to one or more of the examples disclosed above, in some examples, the first sensor arrangement comprises a plurality of first sensor elements disposed along a first diagonal direction and the second sensor arrangement comprises a plurality of second sensor elements, different from the first sensor elements, disposed along a second diagonal direction, different from the first diagonal direction. Additionally or alternatively to one or more of the examples disclosed above, in some examples, the method further comprises detecting a movement of the shaft toward or away from the optical sensor.

Some examples of the disclosure are directed to a non-transitory computer readable storage medium having stored thereon a set of instructions, that when executed by a processor causes the processor to: detect a rotation of a mechanical input mechanism comprising a rotatable shaft; and detect a movement of the shaft toward or away from an optical sensor. Additionally or alternatively to one or more of the examples disclosed above, in some examples, the optical sensor includes a first sensor arrangement having a first position and a second sensor arrangement having a second position, and detecting movement of the shaft toward or away from the optical sensor is based on a relationship between a first amount of detected light incident on the first sensor arrangement and a second amount of detected light incident on the second sensor arrangement. Additionally or alternatively to one or more of the examples disclosed above, in some examples, instructions further cause the processor to: detect light incident on the optical sensor, and detect the movement of the shaft toward or away from the optical sensor based on at least a change in a position of the light incident on the optical sensor. Additionally or alternatively to one or more of the examples disclosed above, in some examples, detecting the movement of the shaft toward or away from the optical sensor is based on a change in a magnification of an image of the shaft on the optical sensor. Additionally or alternatively to one or more of the examples disclosed above, in some examples, the instructions further cause the processor to: detect light incident on the optical sensor, the light having a position and an orientation, the orientation of the light based on at least a position of the rotatable shaft; and detect a movement of the shaft based on at least a change in the orientation of the light.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An apparatus comprising:
  a mechanical input mechanism having an encoding pattern thereon comprising rotatable shaft;
  a light source configured to direct light toward the mechanical input mechanism; and
  an optical sensor comprising a first, second, third, and fourth sensor element configured to:
    receive light reflected by the encoding pattern disposed on the mechanical input mechanism;
    detect a rotation of the shaft based on a pattern of dark and bright stripes in the reflected light reflected by the encoding pattern, wherein a first amount of light measured by the first sensor element is combined with a second amount of light measured by the second sensor element into a first combined light measurement value and a third amount of light measured by the third sensor element is combined with a fourth amount of light measured by the fourth sensor element into a second combined light measurement value during the detection of the rotation of the shaft; and
    detect a tilting movement of the shaft toward or away from the optical sensor based on the reflected light, wherein the first amount of light measured by the first sensor element is combined with the third amount of light measured by the third sensor element into a third combined light measurement value and the second amount of light measured by the second sensor element is combined with the fourth amount of light measured by the fourth sensor element into a fourth combined measurement value, an amount of the tilting movement of the shaft toward or away from the optical sensor determined by a comparison of the third combined measurement value and the fourth combined measurement value.

2. The apparatus of claim 1, wherein detecting the movement of the shaft toward or away from the optical sensor is based at least in part on a change in a magnification of an image of the reflected encoding pattern on the first, second, third, and fourth sensor elements of the optical sensor.

3. The apparatus of claim 1, wherein:
the first, second, third, and fourth combined measurement values are determined by performing a sum; and
the comparison of third combined measurement value and the fourth combined measurement value is determined by calculating a difference between the third and fourth combined measurement values.

4. The apparatus of claim 1, wherein:
the first, second, third, and fourth combined measurement values are determined by performing a sum; and
the comparison of third combined measurement value and the fourth combined measurement value is determined by calculating a ratio between the third and fourth measurement values.

5. The apparatus of claim 4, wherein the optical sensor includes a first sensor arrangement having a first plurality of sensor elements of a first size at a first position and a second sensor arrangement having a second plurality of sensor elements of the first size at a second position, a third plurality of sensor elements of a second size, different from the first size, at a third location, and detecting movement of the shaft toward or away from the optical sensor is based on a relationship between a first amount of detected light incident on the first sensor arrangement with a second amount of detected light incident on the second sensor arrangement.

6. An apparatus comprising:
a mechanical input mechanism comprising a rotatable shaft;
a light source configured to direct light toward the :mechanical :input :mechanism; and
an optical sensor comprising a first, second, third, and fourth SCEISOF element configured to:
receive :reflected light reflected by an encoding pattern disposed on the mechanical input mechanism:
detect the :reflected light incident on the optical sensor, the light having a position and an orientation, the orientation of the reflected light based on at least a position of the rotatable shaft;
detect a rotation of the shaft based on a pattern of dark and bright stripes in the reflected light reflected by the encoding pattern, wherein a first amount of light measured by the first sensor element is combined with a second amount of light measured by the second sensor element into a first combined light measurement value and a third amount of light measured by the third sensor element is combined with a fourth amount of light measured by the fourth sensor element into a second combined light measurement value during the detection of the rotation of the shaft; and
detect a tilting movement of the shaft toward or away from the optical sensor based on at least a change in the orientation of the pattern of dark and bright stripes in the reflected light, wherein the first amount of light measured by the first sensor element is combined with the third amount of light measured by the third sensor element into a third combined light measurement value and the second amount of light measured by the second sensor element is combined with the fourth amount of light measured by the fourth sensor element into a fourth combined measurement value, an amount of the tilting movement of the shaft toward or away from the optical sensor determined by a comparison of the third combined measurement value and the fourth combined measurement value.

7. The apparatus of claim 6, wherein the optical sensor includes a first sensor arrangement having a first plurality of sensor elements of a first size and a second sensor arrangement having a second plurality of sensor elements of the first size, a third plurality of sensor elements of a second size, different from the first size, at a third location, and detecting movement of the shaft is based on a relationship between a first amount of detected light incident on the first sensor arrangement and a second amount of detected light incident on the second sensor arrangement.

8. The apparatus of claim 7, wherein:
the first sensor arrangement has a first sensor orientation corresponding to a first orientation of the light and the second sensor arrangement has a second sensor orientation corresponding to a second orientation of the light,
the first amount of detected light greater than the second amount of detected light corresponds to the first orientation of the light, and
the second amount of detected light greater than the first amount of detected light corresponds to the second orientation of the light.

9. The apparatus of claim 7, wherein the first sensor arrangement comprises the first plurality of sensor elements disposed along a first diagonal direction and the second sensor arrangement comprises the second plurality of sensor elements, different from the first plurality of sensor elements, disposed along a second diagonal direction, different from the first diagonal direction.

10. The apparatus of claim 6, wherein the optical sensor is further configured to detect a movement of the shaft toward or away from the optical sensor based on a change in a magnification of an image of the shaft on the optical sensor.

11. The apparatus of claim 6, wherein the optical sensor is further configured to detect a movement of the shaft toward or away from the optical sensor based on a change in the position of the light.

12. A method comprising the steps of:
directing light toward a mechanical input mechanism having an encoding pattern disposed thereon;
detecting, at an optical sensor comprising a first, second, third, and fourth sensor element, a pattern of dark and bright stripes in a light reflected by the encoding pattern;
detecting a rotation of the mechanical input mechanism comprising a rotatable shaft based on the detected reflected light, wherein a first amount of light measured by the first sensor element is combined with a second amount of light measured by the second sensor element into a first combined light measurement value and a third amount of light measured by the third sensor element is combined with a fourth amount of light measured by the fourth sensor element into a second combined light measurement value during the detection of the rotation of the shaft; and detecting a tilting movement of the shaft toward or away from the optical sensor based on the pattern of dark and bright stripes in the detected reflected light, wherein the first amount of light measured by the first sensor element is combined with the third amount of light measured by the third sensor element into a third combined light measurement value and the second amount of light measured by the second sensor element is combined with the fourth amount of light measured by the fourth sensor element into a fourth combined measurement value, an amount of the tilting movement of the shaft toward or away from the optical sensor determined by a comparison of the third combined measurement value and the fourth combined measurement value.

13. The method of claim 12, wherein:

the first, second, third, and fourth combined measurement values are determined by performing a sum; and the comparison of third combined measurement value and the fourth combined measurement value is determined by calculating a difference between the third and fourth combined measurement values.

14. The method of claim 12, wherein:

the first, second, third, and fourth combined measurement values are determined by performing a sum; and the comparison of third combined measurement value and the fourth combined measurement value is determined by calculating a ratio between the third and fourth measurement values.

15. The method of claim 12, further comprising detecting a movement of the shaft based on at least a change in an orientation of the reflected light incident on the optical sensor.

16. The method of claim 12, wherein the optical sensor includes a first sensor arrangement having a first plurality of sensor elements of a first size at a first position and a second sensor arrangement having a second plurality of sensor elements of the first size at a second position, a third plurality of sensor elements of a second size, different from the first size, at a third location, and detecting movement of the shaft toward or away from the optical sensor is based on at least a relationship between a first amount of detected light incident on the first sensor arrangement and a second amount of detected light incident on the second sensor arrangement.

17. A method comprising the steps of:

directing light toward a mechanical input mechanism having an encoding pattern disposed thereon;

detecting, at an optical sensor comprising a first, second, third, and fourth sensor element, a pattern of dark and bright snipes in a light reflected by the encoding pattern, the light having a position and an orientation, the orientation of the light based on at least a position of the mechanical input mechanism comprising a rotatable shaft;

detecting a rotation of the shaft, wherein a first amount of light measured by the first sensor element is combined with a second amount of light measured by the second sensor element into a first combined light measurement value and a third amount of light measured by the third sensor element is combined with a fourth amount of light measured the by the fourth sensor element into a second combined light measurement value during the detection of the rotation of the shaft; and detecting a tilting movement of the shaft toward or away from the optical sensor based on at least a change in the orientation of the pattern of dark and bright stripes in the reflected light, wherein the first amount of light measured by the first sensor element is combined with the third amount of light measured by the third sensor element into a third combined light measurement value and the second amount of light measured by the second sensor element is combined with the fourth amount of light measured by the fourth sensor element into a fourth combined measurement value, an amount of the tilting movement of the shaft toward or away from the optical sensor determined by a comparison of the third combined measurement value and the fourth combined measurement value.

18. The method of claim 17, wherein the optical sensor includes a first sensor arrangement having a first plurality of sensor elements of a first size and a second sensor arrangement a second plurality of sensor elements of the first size, and a third plurality of sensor elements of a second size, different from the first size, at a third location, and detecting movement of the shaft is based on at least a relationship between a first amount of detected light incident on the first sensor arrangement and a second amount of detected light incident on the second sensor arrangement.

19. The method of claim 18, wherein the first sensor arrangement has a first sensor orientation corresponding to a first orientation of the light and the second sensor arrangement has a second sensor orientation corresponding to a second orientation of the light, the first amount of detected light greater than the second amount of detected light corresponds to the first orientation of the light, and the second amount of detected light greater than the first amount of detected light corresponds to the second orientation of the light.

20. The method of claim 18, wherein the first sensor arrangement comprises the first plurality of sensor elements disposed along a first diagonal direction and the second sensor arrangement comprises the second plurality of sensor elements, different from the first plurality of sensor elements, disposed along a second diagonal direction, different from the first diagonal direction.

21. A non-transitory computer readable storage medium having stored thereon a set of instructions, that when executed by a processor causes the processor to:

direct light toward a mechanical input mechanism having an encoding pattern disposed thereon;

detect, at an optical sensor comprising a first, second, third, and fourth sensor element, a pattern of dark and bright snipes in light reflected by the encoding pattern;

detect a rotation of the mechanical input mechanism comprising a rotatable shaft based on the detected reflected light, wherein a first amount of light measured by the sensor element is combined with a second amount of light measured by the second sensor element into a first combined measurement value and a third amount of light measured by third sensor element is combined with a fourth amount of light pleasured by the fourth sensor element into a second combined light measurement value during the detection of the rotation of the shaft; and detect a tilting, movement of the shaft toward or away from an optical sensor based on the pattern of dark and bright stripes in the detected reflected light, wherein the first amount of light measured by the first sensor element is combined with the third amount of light measured by the third sensor element into a third combined light measurement value and the second amount of light measured by the second sensor element is combined with the fourth amount of light measured by the fourth sensor element into a fourth combined measurement value, an amount of the tilting movement of the shaft toward or away from the optical sensor determined by a comparison of the third combined measurement value and the fourth combined measurement value.

22. The non-transitory computer readable storage medium of claim 21, wherein the optical sensor includes a first sensor arrangement having a first plurality of sensor elements of a first size at a first position and a second sensor arrangement having a second plurality of sensor elements of the first size at a second position, a third plurality of sensor elements of a second size, different from the first size, at a third location, and detecting movement of the shaft toward or away from the optical sensor is based on at least a relationship between a first amount of detected light incident on the first sensor arrangement and a second amount of detected light incident on the second sensor arrangement.

23. The non-transitory computer readable storage medium of claim 21, wherein:

the first, second, third, and fourth combined measurement values are determined by performing a sum; and the comparison of third combined measurement value and the fourth combined measurement value is determined by calculating a difference between the third and fourth combined measurement values.

24. The non-transitory computer readable storage medium of claim 21, wherein:

the first, second, third, and fourth combined measurement values are determined by performing a sum; and the comparison of third combined measurement value and the fourth combined measurement value is determined by calculating a ratio between the third and fourth measurement values.

25. The non-transitory computer readable storage medium of claim 21, wherein the instructions further cause the processor to:

detect the reflected light incident on the optical sensor, the light having a position and an orientation, the orientation of the reflected light based on at least a position of the rotatable shaft; and detect the tilting movement of the shaft based on at least a change in the orientation of the reflected light.

\* \* \* \* \*

UNITED STATES PATENT AND TRADEMARK OFFICE
CERTIFICATE OF CORRECTION

PATENT NO. : 10,444,040 B2  
APPLICATION NO. : 14/866481  
DATED : October 15, 2019  
INVENTOR(S) : Richard Ruh It is certified that error appears in the above-identified patent and that said Letters Patent is hereby corrected as shown below:

In the Claims

In Column 20, Line 43, in Claim 1, after "comprising" insert -- a --.

In Column 21, Lines 43-44, in Claim 6, delete ":mechanical :input :mechanism;" and insert -- mechanical input mechanism; --.

In Column 21, Line 46, in Claim 6, delete "SCEISOF" and insert -- sensor --.

In Column 21, Line 47, in Claim 6, delete ":reflected" and insert -- reflected --.

In Column 21, Line 48, in Claim 6, delete "mechanism:" and insert -- mechanism; --.

In Column 21, Line 49, in Claim 6, delete ":reflected" and insert -- reflected --.

In Column 23, Line 54, in Claim 17, delete "snipes" and insert -- stripes --.

In Column 23, Line 65, in Claim 17, after "measured" delete "the".

In Column 24, Line 19, in Claim 18, before "a" insert -- having --.

In Column 24, Line 50, in Claim 21, delete "snipes" and insert -- stripes --.

In Column 24, Line 54, in Claim 21, before "sensor" insert -- first --.

In Column 24, Line 56, in Claim 21, before "measurement" insert -- light --.

In Column 24, Line 57, in Claim 21, before "third" insert -- the --.

Signed and Sealed this  
Fifth Day of May, 2020

Andrei Iancu  
*Director of the United States Patent and Trademark Office*

In Column 24, Line 58, in Claim 21, delete "pleasured" and insert -- measured --.

In Column 24, Line 62, in Claim 21, delete "tilting," and insert -- tilting --.